United States Patent
Gao et al.

(10) Patent No.: US 12,448,340 B2
(45) Date of Patent: Oct. 21, 2025

(54) ISOBARIC STABLE ISOTOPE-CONTAINING PHOSPHORYLATED PROTEIN LABELING REAGENT, AND PREPARATION METHOD AND APPLICATION THEREOF

(71) Applicant: GUANGDONG PHOBIOLOGY TECH CO., LTD, Shenzhen (CN)

(72) Inventors: Xiang Gao, Xiamen (CN); Xiaoyu Wang, Xiamen (CN); Chengting Huang, Xiamen (CN); Yufen Zhao, Xiamen (CN)

(73) Assignee: GUANGDONG PHOBIOLOGY TECH CO., LTD, Shenzhen (CN)

( * ) Notice: Subject to any disclaimer, the term of this patent is extended or adjusted under 35 U.S.C. 154(b) by 573 days.

(21) Appl. No.: 17/919,496

(22) PCT Filed: Apr. 9, 2021

(86) PCT No.: PCT/CN2021/086224
§ 371 (c)(1),
(2) Date: Oct. 17, 2022

(87) PCT Pub. No.: WO2021/208818
PCT Pub. Date: Oct. 21, 2021

(65) Prior Publication Data
US 2023/0150897 A1  May 18, 2023

(30) Foreign Application Priority Data
Apr. 17, 2020 (CN) .......................... 202010303845.3

(51) Int. Cl.
*C07B 59/00* (2006.01)
*C07K 1/13* (2006.01)
*G01N 30/06* (2006.01)

(52) U.S. Cl.
CPC .............. *C07B 59/008* (2013.01); *C07K 1/13* (2013.01); *G01N 30/06* (2013.01); *G01N 2440/14* (2013.01); *G01N 2458/15* (2013.01)

(58) Field of Classification Search
None
See application file for complete search history.

(56) References Cited

FOREIGN PATENT DOCUMENTS

| CN | 106596967 A | 4/2017 |
| CN | 111499686 A | 8/2020 |
| WO | 2010120946 A1 | 10/2010 |

OTHER PUBLICATIONS

Shao-En Ong, et al., Mass spectrometry-based proteomics turns quantitative, Nature Chemical Biology, 2005, pp. 252-262, vol. 1, No. 5.

(Continued)

*Primary Examiner* — Xiaoyun R Xu
(74) *Attorney, Agent, or Firm* — Bayramoglu Law Offices LLC (57) ABSTRACT

An isobaric stable isotope-containing phosphorylated protein labeling reagent, and a preparation method and application thereof are provided. The protein labeling reagent is a phosphorylated dipeptide organophosphorus reagent labeled by a stable isotope such as deuterium-2, carbon-13, oxygen-18, or nitrogen-15. The preparation method includes: (1) preparation of an isobaric stable isotope-containing amino acid with N-terminal protection, (2) preparation of an isobaric stable isotope-containing amino acid activated ester Fmoc/Boc-$R_1$-NHS with N-terminal protection, (3) preparation of an isobaric stable isotope-containing dipeptide, (4) preparation of an isobaric stable isotope-containing phosphite, (5) preparation of an isobaric stable isotope-containing phosphite dipeptide, and (6) preparation of a stable isotope-labeled N-phosphorylated amino acid activated ester. The present protein labeling reagent can (Continued)

realize the quantitative analysis of polypeptides, standard proteins, proteins in cells, and proteins in urine samples and blood samples, and has the advantages of good accuracy, high sensitivity, no interference of isotope effect and wide applicability.

14 Claims, 2 Drawing Sheets

(56) References Cited

OTHER PUBLICATIONS

Philip L. Ross, et al., Multiplexed Protein Quantitation in *Saccharomyces cerevisiae* Using Amine-Reactive Isobaric Tagging Reagents., Molecular & Cellular Proteomics, 2004.

Steven P. Gygi, et al., Quantitative analysis of comlex protein mixtures using isotope-coded affinity tags, Nature Biotechnology, 1999, pp. 994-998, vol. 17.

Andrew Thompson, et al., Tandem Mass Tags: A Novel Quantification Strategy for Comparative Analysis of Complex Protein Mixtures by MS/MS, Analytical Chemistry, 2003, pp. 1895-1904, vol. 75, No. 8.

Sebastian Virreira Winter, et al., EASI-tag enables accurate multiplexed and interference-free MS2-based proteome quantification, 2017, pp. 1-12.

Jiaming Li, et al., TMTpro reagents: a set of isobaric labeling mass tags enables simultaneous proteome-wide measurements across 16 samples, Nature Methods, 2020.

Shanshan Zhang, et al., Stable isotope N-phosphoryl amino acids labeling for quantitative profiling of amine- containing metabolites using liquid chromatography mass spectrometry, Analytica Chimica Acta, 2017, pp. 1-11.

Xiang Gao, et al., Stable Isotope N Phosphorylation Labeling for Peptide de Novo Sequencing and Protein Quantification Based on Organic Phosphorus Chemistry, Analytical Chemistry, 2012, pp. 10236-10244, vol. 84.

ISOBARIC STABLE ISOTOPE-CONTAINING PHOSPHORYLATED PROTEIN LABELING REAGENT, AND PREPARATION METHOD AND APPLICATION THEREOF

CROSS REFERENCE TO THE RELATED APPLICATIONS

This application is the national phase entry of International Application No. PCT/CN2021/086224, filed on Apr. 9, 2021, which is based upon and claims priority to Chinese Patent Application No. 202010303845.3, filed on Apr. 17, 2020, the entire contents of which are incorporated herein by reference.

TECHNICAL FIELD

The present disclosure belongs to the field of protein labeling reagents, and particularly relates to an isobaric stable isotope-containing phosphorylated protein labeling reagent, and a preparation method and application thereof.

BACKGROUND

Large-scale identification and quantitative analysis of proteins is a key to proteomics research. The new quantitative protein analysis technology plays a crucial role in the discovery of basic life mechanisms and disease markers, and the stable isotope chemical labeling technology based on biological mass spectrometry (bio-MS) plays an increasingly important role in the relative and absolute quantification of proteins[1]. The rapid development of bio-MS instruments plays an essential role in the application and research in protein identification, post-translational modification (PTM), and quantitative protein analysis. The development of bio-MS technology accelerates the progress of proteomics research, but the complexity of samples and the processing of massive data are inevitable challenges of bio-MS technology. It is believed that bio-MS technology will become more significant in proteomics research with the continuous improvement of bio-MS technology.

A variety of stable isotope-labeled protein MS (MS) quantification methods and reagents have been successfully developed; for example, iTRAQ[2], ICAT[3], and TMT[4] have been widely used as commercial reagents in life science and clinical research. Stable isotope-labeled molecular probes based on high-resolution MS have become a core for protein quantification in proteomics research. Various protein quantification methods have been successfully developed based on the principles of chemical reactions and instrumental enzyme catalytic labeling. For example, stable isotope tags based on primary MS, such as multi-labeled reductive methylation, $^{18}O$ labeling, SILAC (Stable Isotope Labeling by Amino Acids in Cell Culture), $^{153}Eu$-labeled quantitative probe, and trypsin-catalyzed N-terminal arginine labeling. Recently, scientists have developed two brand-new techniques for quantifying isobaric labeled proteins: EASI-tag based on peptide reporter ions and TMTpro based on isopropyl-modified proline structures[5-6]. Although some innovations in reporter ion structures have been reported, no improvement has been made in the sensitivity of MS detection.

In addition, the traditional labeling strategy is based on classical protein chemistry, selectivity of labeling chemistry, MS sensitivity and chromatographic separation of labeling reagents, isotope effects, high prices of reagents, and the like, and the quantitative flux is limited, which seriously restricts the study of large-scale quantitative analysis of proteomics. The development of new labeling strategies and labeling reagents is of great significance. Based on the organophosphorus labeling chemistry, the present disclosure synthesizes a series of isobaric stable isotope-labeled organophosphorus reagents with novel structures and uses the reagents to successfully achieve the quantitative analysis of standard proteins and proteins in biological samples.

REFERENCE

1. Ong, S. E.; Mann, M. Mass spectrometry-based proteomics turns quantitative. *Nat. Chem. Biol.* 2005, 1, 252-262.
2. Ross, P. L.; Huang, Y. N.; Marchese, J. N.; Williamson, B.; Parker, K.; Hattan, S.; Khainovski, N.; Pillai, S.; Dey, S.; Daniels, S.; Purkayastha, S.; Juhasz, P.; Martin, S.; Bartlet-Jones, M.; He, F.; Jacobson, A.; Pappin, D. J. Multiplexed protein quantitation in *Saccharomyces cerevisiae* using amine-reactive isobaric tagging reagents. *Mol. Cell. Proteomics* 2004, 3, 1154-1169.
3. Gygi, S. P.; Rist, B.; Gerber, S. A.; Turecek, F.; Gelb, M. H.; Aebersold, R. Quantitative analysis of complex protein mixtures using isotope-coded affinity tags. *Nat. Biotechnol.* 1999, 17, 994-999.
4. Thompson, A.; Schafer, J.; Kuhn, K.; Kienle, S.; Schwarz, J.; Schmidt, G.; Neumann, T.; Hamon, C. Tandem mass tags: a novel quantification strategy for comparative analysis of complex protein mixtures by MS/MS. *Anal. Chem.* 2003, 75, 1895-1904.
5. Winter, S. V.; Meier, F.; Wichmann, C.; Cox, J.; Mann, M.; Meissner, F. EASI-tag enables accurate multiplexed and interference-free MS2-based proteome quantification. *Nature Methods,* 2018, 15, 527-530.
6. Li, J. M.; Van Vranken, J. G.; et al. TMTpro reagents: a set of isobaric labeling mass tags enables simultaneous proteome-wide measurements across 16 samples. *Nature Methods,* 2020, DOI: 10.1038/s41592-020-0781-4.
7. Zhang, S.; Shi, J.; Shan, C.; Huang, C.; Wu, Y.; Ding, R.; Xue, Y.; Liu, W.; Zhou, Q.; Zhao, Y.; Xu, P.; Gao, X., Stable isotope N-phosphoryl amino acids labeling for quantitative profiling of amine-containing metabolites using liquid chromatography mass spectrometry. *Anal. Chim. Acta* 2017, 978, 24-34.
8. Gao, X.; Wu, H.; Lee, K.-C.; Liu, H.; Zhao, Y.; Cai, Z.; Jiang, Y., Stable isotope N-phosphorylation labeling for peptide de novo sequencing and protein quantification based on organic phosphorus chemistry. *Anal. Chem.* (Washington, DC, U. S.) 2012, 84 (23), 10236-10244.

SUMMARY

In view of the shortcomings of the prior art, the present disclosure is intended to provide an isobaric stable isotope-containing phosphorylated protein labeling reagent, and a preparation method and application thereof. In order to achieve the above objective, the present disclosure adopts the following solutions:

The present disclosure provides an isobaric stable isotope-containing phosphorylated protein labeling reagent, characterized in that its structural formula is as follows:

where a is 14 or 15; b is 12 or 13; c is 16 or 18; d is 1 or 2; n is 1, 2, 3, 4, or 5 and preferably 1 or 2; $n_1$ is 0, 1, or 2 and preferably 0 or 1; $R_1$ is a side chain substituent of an L or D-configuration amino acid with or without a stable isotope, and preferably $R_1$ is methyl; and $R_2$ is a side chain substituent of an amino acid with or without a stable isotope, and preferably $R_2$ is hydrogen.

The present disclosure provides a preparation method of an isobaric stable isotope-containing phosphorylated protein labeling reagent, characterized in that it includes the following steps:

(1) preparation of an isobaric stable isotope-containing amino acid with N-terminal protection can be divided into two methods:

method A: an isobaric stable isotope-containing amino acid $R_1$ in was dissolved an alkali solution, cooled, and then an organic solvent for dissolution was added to obtain an amino acid mixed solution; 9-fluorenylmethyl chloroformate was dissolved in an organic solvent and then slowly added to the amino acid mixed solution; the obtained mixture was stirred at a low temperature to allow a reaction and then further stirred at room temperature to allow a reaction; and the solvent was removed, and a residue was purified to obtain an isobaric stable isotope-containing amino acid Fmoc-$R_1$ protected by 9-fluorenylmethoxycarbonyl;

method B: an isobaric stable isotope-containing amino acid $R_1$ in was dissolved an alkali solution, cooled, and then an organic solvent for dissolution was added to obtain an amino acid mixed solution; di-tert-butyl dicarbonate was dissolved in 1,4-dioxane and then slowly adding a resulting solution to the amino acid mixed solution; the obtained mixture was stirred at a low temperature to allow a reaction and then further stirred at room temperature to allow a reaction; the solvent was removed, and a residue was purified to obtain an isobaric stable isotope-containing amino acid Boc-$R_1$ protected by tert-butoxycarbonyl;

(2) preparation of an isobaric stable isotope-containing amino acid activated ester Fmoc/Boc-$R_1$-NHS with N-terminal protection:

Fmoc/Boc-$R_1$ prepared in the step (1) and N-hydroxysuccinimide were dissolved in an organic solvent, and a condensation agent was added to allow a condensation reaction to obtain the isobaric stable isotope-containing amino acid activated ester Fmoc/Boc-$R_1$-NHS with N-terminal protection;

(3) preparation of an isobaric stable isotope-containing dipeptide:

Fmoc/Boc-$R_1$-NHS prepared in the step (2) was dissolved in a mixed solvent and then added to an alkali solution in which the isobaric stable isotope-containing amino acid $R_2$ was dissolved at a low temperature; the obtained mixture was stirred at a low temperature to allow a reaction and then further stirred at room temperature to allow a reaction; and the solvent was removed after the reaction was completed, a obtained residue was purified, and then subjected to a de-Fmoc/Boc treatment to obtain the isobaric stable isotope-containing dipeptide;

(4) preparation of an isobaric stable isotope-containing phosphite:

under the protection of an inert atmosphere, a mixed solution consisting of an isobaric stable isotope-containing alcohol solvent and dichloromethaneis were slowly added dropwise to a solution of phosphorus trichloride in dichloromethane under an ice bath; a obtained mixture was stirred at room temperature to allow a reaction, the reaction was tracked until the phosphorus trichloride was exhausted, and the reaction was stopped; and the solvent and hydrochloric acid gas were removed after the reaction was over, and finally a obtained oily product was distillated under reduced pressure;

(5) preparation of an isobaric stable isotope-containing phosphite dipeptide:

the isobaric stable isotope-containing dipeptide prepared in the step (3) was dissolved in a mixed solution consisting of water and ethanol, triethylamine was added, stirred at a low temperature, and then slowly added dropwise a mixed solution consisting of the isobaric stable isotope-containing phosphite prepared in the step (4) and 6 to 10 equivalents of carbon tetrachloride; a obtained mixture was stirred at a low temperature to allow a reaction and then further stirred at room temperature to allow a reaction; and the solvent was removed, and a obtained residue was purified to obtain a stable isotope-labeled phosphite-alanine-glycine dipeptide; and (6) preparation of a stable isotope-labeled N-phosphorylated amino acid activated ester:

the stable isotope-labeled phosphite-alanine-glycine dipeptide prepared in the step (5) and N-hydroxysuccinimide were dissolved in an organic solvent, and a condensation agent was added to allow a condensation reaction; the solvent was removed after the reaction was over, and a obtained residue was purified to obtain the isobaric stable isotope-containing phosphorylated protein labeling reagent.

Preferably, the alkali solution in the steps (1) and (3) was one selected from the group consisting of a sodium hydroxide solution, a potassium hydroxide solution, a sodium carbonate solution, and a sodium bicarbonate solution and was preferably a sodium carbonate solution; the cooling and the low temperature were ice bath conditions; and the low-temperature stirring reaction time was for 2 h to 4 h and the room temperature stirring reaction was for 5 h to 12 h.

Preferably, the organic solvent in the steps (2) and (6) was one selected from the group consisting of ethylene glycol dimethyl ether and carbon dichloride; and the condensation agent was one selected from the group consisting of DCC and EDCI.

Preferably, the low temperature in the step (5) was an ice bath condition; and the low-temperature stirring reaction time was for 2 h to 4 h and the reaction under stirring at the room temperature was conducted for 4 h to 6 h.

Preferably, in the step (4), the isobaric stable isotope-containing alcohol solvent was one selected from the group consisting of methanol, ethanol, propanol, butanol, and amyl alcohol and was preferably methanol or ethanol.

The present disclosure provides an application of the isobaric stable isotope-containing phosphorylated protein labeling reagent in the quantitative analysis of a polypeptide.

The present disclosure provides an application of the isobaric stable isotope-containing phosphorylated protein labeling reagent in the quantitative analysis of a standard protein or a protein in a cell.

The present disclosure provides an application of the isobaric stable isotope-containing phosphorylated protein labeling reagent in the quantitative analysis of a protein in a urine sample.

The present disclosure provides an application of the isobaric stable isotope-containing phosphorylated protein labeling reagent in the quantitative analysis of a protein in a blood sample.

The specific principle of the present disclosure is as follows:

The isobaric stable isotope-containing phosphorylated protein labeling reagent provided by the present disclosure can be used as an isobaric stable isotope-containing phosphorylated labeled molecular probe (iSIPL) to label the N-terminal and lysine side-chain amino selectively and efficiently of a peptide and then achieve the relative quantitative analysis of the peptide and protein by MS analysis, especially the report ions produced by secondary MS cleavage. At present, most of the quantitative information of bio-MS comes from a primary MS spectrum, that is, stable isotope tags are first introduced into the peptides produced by protein enzymolysis, and then the relative quantification of a protein is conducted by comparing the intensities of MS peaks labeled with stable isotopes in the primary MS spectrum. The method provided by the present disclosure is based on the selection of peptide parent ions. Compared with the primary MS, the secondary MS dramatically reduces a noise level of the secondary MS spectrum, that is, improves a signal-to-noise ratio of the secondary MS spectrum, thereby improving the accuracy and quantitative flux of peptide and protein quantification.

The principle is explained herein by taking the quantification method of an isobaric stable isotope six-labeled N-phosphorylated protein as an example:

As shown in the above figure, after isotope labeling of atoms numbered 1 to 5 in the isobaric stable isotope-containing phosphorylated protein labeling reagent, stable isotopes in the labeling reagent are mainly distributed in a phosphate group of a reporter ion and an equilibrium linker arm. In order to make the reporter ion appear at a low molecular weight end and have prominent stability and the highest MS analysis sensitivity in the secondary MS cleavage, an ethoxyl structure is adopted for the phosphate group; considering the availability of the $^{13}C$ and $^{15}N$ labeling synthesis module, glycine at a relatively low price is adopted for the equilibrium linker arm in the labeling reagent; and the interference of peptide cleavage fragment ions to the reporter ion is investigated after labeling with different organophosphorus reagents. A labeling reagent that does not interfere with the reporter ion in the corresponding m z range is selected.

The present disclosure has the following advantages:

(1) The isobaric stable isotope-containing phosphorylated protein labeling reagent provided by the present disclosure is a new structure based on characteristic phosphoramide reporter ions and enables the successful establishment of a method for efficiently introducing a stable isotope atom such as oxygen-18, nitrogen-15, and carbon-13 into an organophosphorus molecular probe, where the relative quantitative analysis of a two-labeled, four-labeled, six-labeled, eight-labeled, or ten-labeled protein is achieved by combining different stable isotope-labeled phosphorylated dipeptide.

(2) The preparation method of the isobaric stable isotope-containing phosphorylated protein labeling reagent provided by the present disclosure has the advantages of cheap and easily-available required raw materials, mild reaction conditions, high labeling efficiency, simple purification method, and high yield.

(3) The isobaric stable isotope-containing phosphorylated protein labeling reagent provided by the present disclosure can be used as molecular probe (iSIPL) for quantitative analysis of polypeptides, quantitative analysis of standard protein samples and protein samples in cells, and quantitative analysis of proteins in urine and blood samples. The results show that the quantification method provided by the present disclosure has the advantages of high sensitivity, high protein coverage, high accuracy, and excellent repeatability.

DETAILED DESCRIPTION OF THE EMBODIMENTS

The present disclosure is further described in detail below in conjunction with embodiments. It should be understood that the following embodiments are only provided to further describe the present disclosure and cannot be understood as a limitation to the protection scope of the present disclosure. The specific mass, reaction time and temperature, process parameters, and the like of the embodiments are each only an Example in an appropriate range, and some non-essential improvements and adjustments made by those skilled in the art according to the above contents of the present disclosure are within the protection scope of the present disclosure. An embodiment in which no specific technology or condition is specified shall be conducted in accordance with the technology or condition described in the literature in the art or in accordance with product instructions. The used reagents or instruments not specified with a manufacturer are conventional products that can be purchased from the market.

Figure 1:
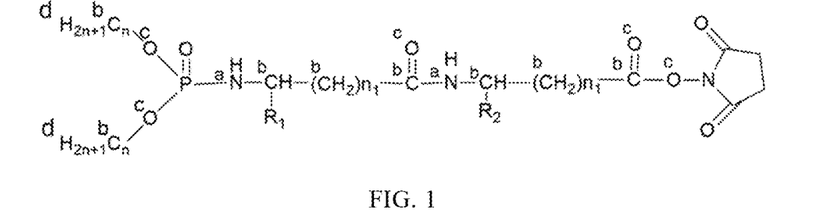
FIG. 1 shows a structural formula of the isobaric stable isotope-containing phosphorylated protein labeling reagent.

FIG. 1 shows a structural formula of the isobaric stable isotope-containing phosphorylated protein labeling reagent prepared by the present disclosure.

The general method for quantitative analysis of an iSIPL-labeled polypeptide and protein includes: an isobaric stable isotope-containing phosphorylated protein labeling reagent is prepared into a reaction solution, then a sample to be tested (which can be any one selected from the group consisting of a polypeptide, a standard protein sample, a protein sample in a cell, and a protein in an urine and blood sample) is added to allow a derivatization reaction, and a resulting product is concentrated, desalted, and then directly analyzed by LC-MS.

The conditions of quantitative analysis by MS are as follows:

The MS includes electrospray ionization-time-of-flight MS (ESI-TOF MS), electrospray ionization-orbitaltrap MS (ESI-Orbitrap MS), electrospray ionization-ion trap MS (ESI-IT MS), matrix-assisted laser-desorption ionization-time-of-flight MS (MALDI-TOF/TOF MS), or the like. ESI-TOF MS and ESI-Orbitrap MS are preferred.

The ion ionization mode is a positive ion mode.

The cleavage mode is collision-induced dissociation (CID), high-energy collision dissociation (HCD), or the like. The HCD mode is preferred.

The high-performance liquid chromatograph includes Easy-NanoLC1000 nanoflow liquid chromatograph and DIONEX Ultimate 3000 high-performance liquid chromatograph.

Example 1 Preparation of a Diethyl Phosphite Alanine-Glycine Dipeptide Activated Ester, Specifically Including the Following Steps (1) An alanine-glycine dipeptide (5 mmol, 731 mg) was taken and added to 2 mL of water, stirred to dissolve, then 2 mL of triethylamine and 1 mL of ethanol were added, stirred and mixed well, and then cooled to −10° C.; 0.71 mL of diethyl phosphite (5.5 mmol) was taken and dissolved in 3 mL of carbon tetrachloride, added dropwise to the dipeptide solution at a low temperature, subjected to a reaction at a low temperature for half an hour, and then gradually warmed to room temperature and subjected to a reaction for 4 h to 6 h; after the reaction was completed, a part of the solvent was removed through concentration by a rotary evaporator, and a residue could be diluted and dissolved by adding an appropriate amount of water; extraction was conducted twice with 2×10 mL of diethyl ether, aqueous layers were collected, adjusted to 2 to 3 with 1 M diluted hydrochloric acid at a low temperature; then extraction was conducted with 3×10 mL of ethyl acetate, organic layers were combined, dried with anhydrous magnesium sulfate, filtered, concentrated, and dried to obtain a white solid or oily liquid crude product, which could be recrystallized with ethyl acetate and n-hexane in a ratio of 1:5 or ethyl acetate and petroleum ether in a ratio of 1:5 to obtain a white solid product, which was denoted as DEPH-L-Ala-Gly and the structure was shown as follows:

DEPH-L-Ala-Gly ($C_9H_{19}N_2O_6P$): $^1$H NMR (600 MHz, $CDCl_3$): δ=7.40 (s, 1H), 4.33-4.28 (m, 1H), 4.16-4.06 (m, 4H), 3.95-3.92 (m, 2H), 1.47 (d, J=6.00 Hz, 3H), 1.38-1.34 (m, 6H) ppm. $^{13}$C NMR (151 MHz, $CDCl_3$): δ=173.51, 172.63, 63.34 (dd, $J_1$=4.53 Hz, $J_2$=6.04 Hz), 51.19, 41.53, 20.99, 16.10 (dd, $J_1$=$J_2$=1.51 Hz) ppm. $^{31}$P NMR (243 MHz, $CDCl_3$): δ=7.29 ppm. ESI-MS: [M−H]$^-$, m/z 281.0905 (theoretical value: 281.0902, relative error: 1.1 ppm).

The DEPH-L-Ala-Gly (1 mmol, 282.24 mg) obtained above, N-hydroxysuccinimide (1.02 mmol, 117 mg), and DCC (1.05 mmol, 217 mg) were dissolved in 10 mL of dichloromethane, and the reaction stirred at room temperature overnight; after the reaction was completed, the mixture was filtered, the filtrate was concentrated; and the solid product was recrystallized with ethyl acetate and n-hexane in a ratio of 1:6 to obtain the white solid compound (namely, the target product), which was denoted as DEPH-L-Ala-Gly-NHS, which has a structure shown as follows:

DEPH-L-Ala-Gly-NHS ($C_{13}H_{22}N_3O_8P$): $^1$H NMR (600 MHz, $CDCl_3$): δ=7.79 (t, 1H), 4.44 (d, J=6.00 Hz, 2H), 4.14-4.06 (m, 4H), 3.93-3.90 (m, 1H), 3.71-3.65 (m, 1H), 2.89 (s, 4H), 1.47 (d, J=6.00 Hz, 3H), 1.37-1.33 (m, 6H) ppm. $^{13}$C NMR (151 MHz, $CDCl_3$): δ=174.04 (d, J=6.04 Hz), 168.71, 165.69, 62.99 (dd, J=$J_2$=4.53 Hz), 51.11, 38.98, 25.60, 20.65 (d, J=4.53 Hz), 16.19 (dd, $J_1$=$J_2$=3.02 Hz) ppm. $^{31}$P NMR (243 MHz, $CDCl_3$): δ=7.25 ppm.

Example 2 Preparation of Two-Labeled Diethyl Phosphite Alanine-Glycine Dipeptide Activated Ester with Stable Isotopes of Nitrogen-15, Specifically Including the Following Steps Step 1. Synthesis of Stable Isotope-labeled Boc-Ala L-$N^{15}$-Ala (5 mmol) was dissolved in a NaOH (1 M, 5 mL) aqueous solution and cooled to 0° C. A solution of (Boc)$_2$O (1.636 g, 7.5 mmol) in 1,4-dioxane (10 mL) was added dropwise to the NaOH aqueous solution, NaHCO$_3$ (420 mg, 5 mmol) was added, and a reaction mixture was stirred overnight at room temperature; a reaction solution was evaporated under reduced pressure, then 10 mL of water was added, and the excess (Boc)$_2$O was removed with EtOAc (15 mL×2), cooled in an ice bath and then acidified with a KHSO$_4$ aqueous solution (1 M) to a pH of 2.5 to 3. The aqueous layer was extracted with EtOAc (3×25 mL). Finally, the combined extraction solution was washed with a saturated NaCl solution, dried with anhydrous MgSO4, and the solvent was concentrated under reduced pressure to obtain a white solid product Boc-$N^{15}$-Ala (877 mg, 92%), which had a structure shown as follows:

Boc-N$^{15}$-Ala (C$_8$H$_{15}$$^{15}$NO$_4$): $^1$H NMR (600 MHz, MeOD) δ=4.11 (q, J=7.4 Hz, 1H), 1.44 (s, 9H), 1.35 (dd, J=7.3, 3.0 Hz, 3H) ppm. $^{13}$C NMR (151 MHz, MeOD) =175.40, 156.46 (d, J=26.0 Hz), 79.05, 48.96 (d, J=12.8 Hz), 27.35, 16.55 ppm. ESI-MS: m z=189.0897 ([M−H]$^−$, theoretical mass: 189.0893, relative error: 2.1 ppm).

Step 2. Synthesis of Stable Isotope-labeled BOC-Ala-Gly

At 0° C., DCC (1.33 g, 6.45 mmol) was added to a EtOAc solution of Boc-N$^{15}$-Ala (877 mg, 4.61 mmol), N-hydroxysuccinimide (583.5 mg, 5.07 mmol). and a resulting mixture was stirred for 30 min at a low temperature and further stirred for 24 h at room temperature. The impurity of DCU generated was removed by filtration, and the solvent was evaporated under reduced pressure; and pentane (63 mL) was added to the residue, stirred for 2 h under N$_2$ and then filtered to obtain BOC-N$^{15}$-Ala-OSU, which would be directly used in the next reaction.

The BOC-N$^{15}$-Ala-OSU (4.61 mmol) synthesized was taken and dissolved in 18.44 mL of acetone and 73.76 mL of ethanol, slowly added dropwise to a NaHCO$_3$ (9.22 mmol, 774.5 mg) aqueous solution of glycine (4.61 mmol, 346 mg) at 0° C.; subjected to a reaction at room temperature for 20 h after the dropwise addition was completed. After the reaction was stopped; a part of the solvent was concentrated under reduced pressure and removed, 46.1 mL of H$_2$O was added to the residue, and shaken for thorough mixing. The aqueous layer was extracted with ethyl acetate (2×25 mL), the residual aqueous solution was cooled to 0° C., and pH was adjusted to about 2 with diluted hydrochloric acid (1 M). The acidic aqueous solution was extracted with ethyl acetate (3×60 mL), and the organic layers were combined, washed with a saturated NaCl aqueous solution, dried with anhydrous MgSO$_4$, filtered, and concentrated under reduced pressure to obtain a crude product. The crude product was recrystallized with petroleum ether and ethyl acetate in a ratio of 5:1 to obtain a white solid product BOC-N$^{15}$-Ala-Gly (800 mg, 70%), which had a structure shown as follows:

Boc-N$^{15}$-Ala-Gly (C$_{10}$H$_{18}$N$^{15}$NO$_5$): $^1$H NMR (600 MHz, MeOD)=4.18-3.99 (m, 1H), 3.91 (q, J=17.8 Hz, 2H), 1.44 (s, 9H), 1.32 (dd, J=7.2, 3.0 Hz, 3H) ppm. $^{13}$C NMR (151 MHz, MeOD) δ=174.85, 171.35, 156.34, 79.25, 50.10 (d, J=11.4 Hz), 40.35, 27.30, 17.00 ppm. ESI-MS: m z=246.1120 ([M−H]$^−$, theoretical mass: 246.1108, relative error: 4.9 ppm).

Similarly, BOC-Ala (5 mmol, 946.1 mg) and N$^{15}$-Gly (5 mmol, 380.3 mg) were subjected to a reaction to obtain a white solid product BOC-Ala-N$^{15}$-Gly (864 mg, 70%), which had a structure shown as follows:

Boc-Ala-N$^{15}$-Gly (C$_{10}$H$_{18}$N$^{15}$NO$_5$): $^1$H NMR (600 MHz, MeOD) δ=4.10 (m, 1H), 3.91 (q, J=17.8 Hz, 2H), 1.44 (s, 9H), 1.32 (d, J=7.2 Hz, 3H) ppm. $^{13}$C NMR (151 MHz, MeOD) δ=175.12, 171.35, 156.26, 79.26, 50.10 (d, J=11.4 Hz), 40.34 (d, J=12.8 Hz), 27.30, 17.00 ppm. ESI-MS: m z=246.1120 ([M−H]$^−$, theoretical mass: 246.1108, relative error: 4.9 ppm).

Step 3. Synthesis of Stable Isotope-labeled Ala-Gly

BOC-N$^{15}$-Ala-Gly (3.2 mmol, 800 mg) was dissolved in 8 mL of THF, 8 mL of concentrated hydrochloric acid was added, subjected to a reaction for 3 h at room temperature under the protection of N$_2$, the solvent was evaporated, the residue was dissolved in 10 mL of H$_2$O; the aqueous layer was extracted with CH$_2$Cl$_2$ (2×10 mL), evaporated under reduced pressure to obtain a light-yellow oily substance N$^{15}$-Ala-Gly, which would be directly used for the next reaction without further purification. Similarly, BOC-Ala-N$^{15}$-Gly (3.5 mmol, 864 mg) was subjected to a reaction to obtain a light-yellow oily liquid Ala-N$^{15}$-Gly, which had a structure shown as follows:

N$^{15}$-Ala-Gly (C$_5$H$_{10}$N$^{15}$NO$_3$): $^1$H NMR (600 MHz, D$_2$O) δ=4.08 (q, J=7.1 Hz, 1H), 3.98 (s, 2H), 1.48 (dd, J=7.1, 3.1 Hz, 3H) ppm. $^{13}$C NMR (151 MHz, D$_2$O) δ=172.96, 171.29, 49.02 (d, J=6.9 Hz), 41.09, 16.38 ppm. ESI-MS: m z=146.0583 ([M−H]$^−$, theoretical mass: 146.0584, relative error: 0.68 ppm).

Similarly, Ala-N$^{15}$-Gly was prepared, which had a structure shown as follows:

Ala-N$_{15}$-Gly (C$_5$H$_{10}$N$^{15}$NO$_3$): $^1$H NMR (600 MHz, D$_2$O) δ=4.08 (q, J=7.1 Hz, 1H), 3.97 (s, 2H), 1.47 (d, J=7.1 Hz, 3H) ppm. $^{13}$C NMR (151 MHz, D$_2$O) δ=172.95, 171.28 (d, J=17.2 Hz), 49.03 (d, J=9.5 Hz), 41.05 (d, J=12.6 Hz), 16.36 ppm. ESI-MS: m z=146.0583 ([M−H]$^−$, theoretical mass: 146.0584, relative error: 0.68 ppm).

Step 4. Synthesis of Stable Isotope-labeled DEPH-Ala-Gly

N$^{15}$-Ala-Gly (3 mmol, 443 mg) was dissolved in 3 mL of water, then 1.5 mL of triethylamine and 1.5 mL of ethanol were added, thoroughly stirred and then cooled to 0° C.; diethyl phosphite (3.3 mmol, 0.425 mL) was taken and dissolved in 3 mL of carbon tetrachloride, added dropwise to the dipeptide solution, subjected to a reaction for 6 h at a low temperature; and after the reaction was stopped, a part of the solvent was evaporated under reduced pressure and removed, and the crude product was subjected to high-performance liquid chromatography to obtain a transparent oily substance DEPH-N$^{15}$-Ala-Gly (513 mg, 60.3%). Similarly, Ala-N$^{15}$-Gly (3.5 mmol, 514 mg) and diethyl phosphite (3.85 mmol, 0.496 mL) were subjected to a reaction to obtain a transparent oily substance DEPH-Ala-N$^{15}$-Gly (599.2 mg, 60.4%), which had a structure shown as follows:

DEPH-N$^{15}$-Ala-Gly (C$_9$H$_{19}$N$^{15}$NO$_6$P): $^1$H NMR (600 MHz, CDCl$_3$) δ=7.38 (s, 1H), 4.23 (dd, J=18.6, 5.9 Hz, 1H), 4.10-3.98 (m, 4H), 3.89 (dd, J=18.5, 3.7 Hz, 2H), 1.41 (dd, J=6.9, 2.7 Hz, 3H), 1.37-1.23 (m, 6H) ppm. $^{13}$C NMR (151 MHz, CDCl$_3$) δ=173.64, 172.55, 63.33 (dd, J=18.3, 5.7 Hz), 51.15 (d, J=8.3 Hz), 41.51, 20.93 (d, J=4.6 Hz), 16.09 (dd, J=6.9, 1.9 Hz). $^{31}$P NMR (243 MHz, CDCl$_3$) δ=7.40 ppm. ESI-MS: m z=284.1029 ([M+H]$^+$, theoretical mass: 284.1029, relative error: 0 ppm), 306.0848 ([M+Na]$^+$, theoretical mass: 306.0849, relative error: 0.32 ppm).

Similarly, DEPH-Ala-N$^{15}$-Gly was prepared, which had a structure shown as follows:

DEPH-Ala-N$^{15}$-Gly (C$_9$H$_{19}$N$^{15}$NO$_6$P): $^1$H NMR (600 MHz, CDCl$_3$) δ=7.52 (dq, J=93.78, 3.8 Hz, 1H), 4.27 (dd, J=18.6, 5.9 Hz, 1H), 4.15-4.05 (m, 4H), 3.95 (dd, J=18.6, 3.7 Hz, 2H), 1.46 (d, J=7.0 Hz, 3H), 1.35 (dt, J=12.4, 7.1 Hz, 6H) ppm. $^{13}$C NMR (151 MHz, CDCl$_3$) δ=173.64 (dd, J=15.6, 6.5 Hz), 172.53, 63.31 (dd, J=18.6, 5.8 Hz), 51.15 (d, J=8.1 Hz), 41.49 (d, J=13.3 Hz), 20.90 (d, J=4.7 Hz), 16.09 (dd, J=6.9, 1.9 Hz) ppm. $^{31}$P NMR (243 MHz, CDCl$_3$) δ=7.34 ppm. ESI-MS: m/z=284.1029 ([M+H]$^+$, theoretical mass: 284.1029, relative error: 0 ppm), 306.0847 ([M+Na]+, theoretical mass: 306.0849, relative error: 0.65 ppm).

Step 5. Synthesis of Stable Isotope-labeled DEPH-Ala-Gly-NHS

DEPH-N$^{15}$-Ala-Gly (1.81 mmol, 513 mg) and N-hydroxysuccinimide (1.84 mmol, 212.5 mg) were dissolved in 18 mL of dichloromethane, DCC (1.99 mmol, 410.8 mg) was added at 0° C., the reaction solution was subjected to a reaction for half an hour at a low temperature, transferred to a room temperature and the reaction stirred overnight; and after the reaction was completed, the mixture was filtered, the filtrate was concentrated, and the product was recrystallized with dichloromethane and n-hexane in a ratio of 1:6 to obtain the white solid compound DEPH-N$^{15}$-Ala-Gly-NHS (687 mg, 99%). Similarly, DEPH-Ala-N$^{15}$-Gly (2.115 mmol, 599.2 mg) and N-hydroxysuccinimide (2.157 mmol, 248.2 mg) were subjected to a reaction to obtain DEPH-Ala-N$^{15}$-Gly-NHS (748 mg, 93%), which had a structure shown as follows:

DEPH-N$^{15}$-Ala-Gly-NHS (C$_{13}$H$_{22}$N$_2$$^{15}$NO$_8$P): $^1$H NMR (600 MHz, CDCl$_3$) δ=7.84 (t, J=5.5 Hz, 1H), 4.37 (dd, J=5.6, 2.2 Hz, 2H), 4.09-4.00 (m, 4H), 3.87 (dt, J 16.5, 7.0 Hz, 1H), 2.82 (s, 4H), 1.40 (dd, J=6.7, 2.7 Hz, 3H), 1.29 (dt, J=9.1, 7.1 Hz, 6H) ppm. $^{13}$C NMR (151 MHz, CDCl$_3$) δ=174.13 (d, J=5.5 Hz), 168.77, 165.70, 77.29, 77.08, 76.86, 63.03 (dd, J=18.8, 5.6 Hz), 51.11 (d, J=8.4 Hz), 38.96, 25.60, 20.71 (d, J=5.0 Hz), 16.16 (dd, J=7.0, 3.3 Hz) ppm. $^{31}$P NMR (243 MHz, CDCl$_3$) δ=7.25 ppm. ESI-MS: m/z=381.1191 ([M+H]$^+$, theoretical mass: 381.1193, relative error: 0.52 ppm), 403.1012 ([M+Na]$^+$, theoretical mass: 403.1013, relative error: 0.24 ppm).

Similarly, DEPH-Ala-N$^{15}$-Gly-NHS was prepared, which had a structure shown as follows:

DEPH-Ala-N$^{15}$-Gly-NHS (C$_{13}$H$_{22}$N$_2$$^{15}$NO$_8$P): $^1$H NMR (600 MHz, CDCl$_3$) δ=7.81 (dt, J=94.1, 5.7 Hz, 1H), 4.37 (d, J=5.5 Hz, 2H), 4.10-4.00 (m, 4H), 3.87 (dt, J=16.6, 7.0 Hz, 1H), 2.83 (s, 4H), 1.41 (d, J=6.9 Hz, 3H), 1.29 (dt, J=9.1, 7.1 Hz, 6H) ppm. $^{13}$C NMR (151 MHz, CDCl$_3$) δ=174.08 (dd, J=14.4, 5.5 Hz), 168.76, 165.69, 63.06 (dd, J=18.6, 5.6 Hz), 51.12 (d, J=8.6 Hz), 38.96 (d, J=13.5 Hz), 25.60, 20.69 (d, J=5.1 Hz), 16.16 (dd, J=6.9, 3.2 Hz) ppm. $^{31}$P NMR (243 MHz, CDCl$_3$) δ=7.26 ppm. ESI-MS: m z=381.1190 ([M+H]$^+$, theoretical mass: 381.1193, relative error: 0.78 ppm), 403.1010 ([M+Na]$^+$, theoretical mass: 403.1013, relative error: 0.7 ppm).

Example 3 Preparation of a Six-Labeled Diethyl Phosphite Alanine-Glycine Dipeptide Activated Ester with Stable Isotopes of Deuterium-2, Carbon-13, Oxygen-18, and Nitrogen-15

Step 1. Preparation of nitrogen-15-labeled 9-fluorenylmethoxycarbonyl-L-alanine $^{15}$N-L-Ala (7.6 mmol, 684 mg) was weighted and dissolved in 30 mL of a Na$_2$CO$_3$ (19 mmol, 2 g) aqueous solution, cooled to 0° C., and then 19 mL of 1,4-dioxane was slowly added dropwise; 9-fluorenylmethyl chloroformate (8.4 mmol, 2.17 g) was dissolved in 19 mL of 1,4-dioxane, slowly added dropwise to the amino acid solution, stirred for 2 h at a low temperature and then transferred to a room temperature and the reaction stirred for 5.5 h. after the reaction was completed, the solvent was removed through concentration by a rotary evaporator, and the residual solid was dissolved in 150 mL of water; extraction was conducted with 4×40 mL of anhydrous diethyl ether, the aqueous layer was retained and the pH was adjusted to about 2 with a 3 M HCl aqueous solution to obtain a white precipitate; then extraction was conducted with 4×50 mL of ethyl acetate, the organic layer were collected and washed once with 40 mL of a saturated NaCl aqueous solution, dried with anhydrous magnesium sulfate, filtered, and then a filtrate was concentrated to obtain the white solid crude product; and the white solid obtained was further purified as follows: 40 mL of n-hexane was added, stirred for 1 h, filtered to remove filtrate; and the solid was dried with a depressurized vacuum pump; after the obtained white solid with an appropriate amount of ethyl acetate under heating, n-hexane was added at a volume about 10 times for recrystallization, and stored overnight in a 4° C. refrigerator such that an increased amount of the solid product was precipitated to obtain a pure white solid, which was denoted as Fmoc-$^{15}$N-Ala ($C_{18}H_{17}^{15}NO_4$) and had a structure shown as follows:

Fmoc-$^{15}$N-Ala ($C_{18}H_{17}^{15}NO_4$): $^1$H NMR (600 MHz, CD$_3$OD): δ=7.77-7.28 (m, 8H), 4.31 (m, 2H), 4.19 (q, 2H), 3.31 (dt, $J_1=J_2=6.00$ Hz, 1H), 1.40 (dd, $J_1=J_2=6.00$ Hz, 3H) ppm. $^{13}$C NMR (151 MHz, CD$_3$OD): δ=175.23, 157.05 (d, J=27.18 Hz), 143.86 (d, J=25.67 Hz), 141.17, 127.39, 126.77 (d, J=4.53 Hz), 124.88 (d, J=9.06 Hz), 119.52, 66.59, 49.45 (d, J=13.59 Hz), 46.94, 16.42 ppm. ESI-MS:[M+Na]$^+$, m z 335.1017 (theoretical mass: 335.1026, relative error: 2.7 ppm). ESI-MS:[M−H]$^-$, m z 311.1056 (theoretical mass: 311.1050, relative error: 2 ppm). Similarly, $^{15}$N-D-Ala was used instead of the starting material $^{15}$N-L-Ala to prepare Fmoc-$^{15}$N-D-Ala ($C_{18}H_{17}^{15}NO_4$) with the remaining conditions unchanged.

Step 2. Preparation of
9-fluorenylmethoxycarbonyl-L-alanine Labeled with
an Isotope of Oxygen-18

A double-necked flask was dried and cooled, and magnetons and weighted Fmoc-L-Ala (1 mmol, namely, 311 mg) were added and dried for about 2 h; 10 mL of oxygen-18 water was prepared (180 μL of acetyl chloride was added to obtain 0.25 M HCl), nitrogen replacement was conducted for protection, and the flask was tightly plugged for later use; and a nitrogen balloon was prepared for later use.

A condenser tube was dried and connected to the nitrogen balloon, a dried sample and the double-necked bottle are connected to the condenser tube and the nitrogen balloon outside an infrared lamp, air in the system was replaced by a water pump, and the device was prepared and loaded with condensation water; then 1.5 mL of anhydrous 1,4-dioxane was taken by a syringe, thoroughly stirred and then gradually heated to 110° C.; 0.5 mL of the prepared oxygen-18 water (25 mmol, namely, 25 equivalents) was added dropwise, and a resulting mixture was stirred to allow a reaction for 24 h under condensation reflux. After the reaction was completed, the reaction solution was transferred to a single-necked round-bottomed flask after cooling to room temperature; and under anhydrous conditions, the same equivalent of oxygen-18 water was used to allow a reaction for 24 h under stirring and reflux, the concentration and dry were conducted to obtain a light-yellow solid powder (namely, the target compound), which was denoted as Fmoc-Ala-$^{18}$OH ($C_{18}H_{17}N^{18}OO_3$) and had a structure shown as follows:

Fmoc-Ala-$^{18}$OH ($C_{18}H_{17}N^{18}OO_3$): $^1$H NMR (600 MHz, CD$_3$OD): δ=7.78-7.28 (m, 8H), 4.34 (dd, $J_1=J_2=6.00$ Hz, 1H), 4.28 (dd, $J_1=J_2=6.00$ Hz, 1H), 4.20 (t, J=6.00 Hz, 2H), 3.31 (dt, $J_1=J_2=6.00$ Hz, 1H), 1.40 (d, J=6.00 Hz, 3H) ppm. $^{13}$C NMR (151 MHz, CD$_3$OD): δ=175.15, 157.06, 143.87 (d, J=24.16 Hz), 141.17, 127.39, 126.77 (d, J=4.53 Hz), 124.88 (d, J=9.06 Hz), 119.52, 66.59, 49.43, 46.94, 16.40 ppm.

ESI-MS:[M+Na]$^+$, m/z 338.1132 (theoretical mass: 338.1140, relative error: 2.4 ppm).

In order to exchange nitrogen-15 of the 9-fluorenylmethoxycarbonyl-L-alanine with oxygen-18, the compound Fmoc-$^{15}$N-Ala ($C_{18}H_{17}^5NO_4$) and oxygen-18 water were subjected to repeated exchange reactions according to this method to obtain a target compound Fmoc-$^{15}$N-Ala-$^{18}$OH ($C_{18}H_{17}^{15}N^{18}OO_3$), which had a structure shown as follows:

Fmoc-$^{15}$N-Ala-$^{18}$OH ($C_{18}H_{1715}N^{18}OO_3$): $^1$H NMR (600 MHz, CD$_3$OD): δ=7.76-7.27 (m, 8H), 4.30 (m, 2H), 4.19 (dt, $J_1=12.00$ Hz, $J_2=6$ Hz, 2H), 3.32 (dt, $J_1=J_2=6.00$ Hz, 1H), 1.40 (dd, $J_1=J_2=6.00$ Hz, 3H) ppm. $^{13}$C NMR (151 MHz, CD$_3$OD): δ=177.13, 159.00 (d, J=27.18 Hz), 145.82 (d, J=25.67 Hz), 143.12, 129.35, 128.73 (d, J=4.53 Hz), 126.84 (d, J=10.57 Hz), 121.49, 68.55, 51.39 (d, J=13.59 Hz), 48.89, 18.39 ppm. ESI-MS:[M+Na]$^+$, m/z 339.1077 (theoretical mass:339.1111, relative error: 8 ppm).

Step 3. Preparation of
9-fluorenylmethoxycarbonyl-alanine-glycine
dipeptide Labeled with Stable Isotopes of
Oxygen-18, Carbon-13, and Nitrogen-15

9-fluorenylmethoxycarbonyl-L-alanine (Fmoc-Ala, 3 mmol, 933 mg) and N-hydroxysuccinimide (3 mmol, 345 mg) were taken and dissolved in about 30 mL of dichloromethane, cooled to about 0° C., then DCC (3.3 mmol, 680 mg) was added, and the reaction stirred at a low temperature for 24 h. After the reaction was completed, the impurity DCU generated was removed by filtration, and the filtrate was concentrated under reduced pressure to obtain the white solid crude product (9-fluorenylmethoxycarbonyl-L-alanine-N-hydroxysuccinimide (yield: 96%), which would be used for the next reaction without further purification. The synthesized 9-fluorenylmethoxycarbonyl-L-alanine-N-hydroxysuccinimide (3 mmol) was taken and dissolved in 12 mL of acetone and 48 mL of ethanol, slowly added dropwise to a NaHCO$_3$ (6 mmol, 504 mg) aqueous solution of glycine (3 mmol, 225 mg) at 0° C., subjected to a reaction at room temperature for 20 h after the dropwise addition was completed. After the reaction was stopped, the solvent was concentrated under reduced pressure and removed, 30 mL of H$_2$O was added to the residue, shaken for thorough mixing and then filtered to remove insoluble substances; and pH of a filtrate was adjusted with diluted hydrochloric acid to about 2 such that a large amount of a white solid was precipitated, filtered to obtain a gel-like solid product, and the gel-like solid product was lyophilized to obtain a white solid powder namely, the target compound Fmoc-Ala-$^{15}$N-Gly (C$_{20}$H$_{20}$N$_2$O$_5$) (1,104 mg, yield: 81%), which had a structure shown as follows:

Fmoc-Ala-$^{15}$N-Gly (C$_{20}$H$_{20}$N$_2$O$_5$): $^1$H NMR (600 MHz, CD$_3$OD): δ=7.80-7.29 (m, 8H), 4.36 (d, J=6.00 Hz, 2H), 4.16 (dt, J$_1$=J$_2$=6.00 Hz, 2H), 3.90 (q, J=18.00 Hz, 2H), 3.31 (dt, J$_1$=J$_2$=6.00 Hz, 2H), 1.36 (d, J=6.00 Hz, 3H) ppm. $^{13}$C NMR (151 MHz, CD$_3$OD): δ=174.55 (d, J=15.10 Hz), 171.50, 156.89, 143.88 (d, J=24.16 Hz), 141.20, 127.39, 126.78, 124.83 (d, J=7.55 Hz), 119.52, 66.56, 50.53 (d, J=7.55 Hz), 46.98, 40.41 (d, J=12.08 Hz), 16.87 ppm.
ESI-MS: [M+Na]$^+$, m/z 392.1229 (theoretical mass: 392.1240, relative error: 2.8 ppm).

Similarly, in order to synthesize a 9-fluorenylmethoxycarbonyl-L-alanine-glycine dipeptide labeled with other stable isotopes according to the above method, 9-fluorenylmethoxycarbonyl-L/D-alanine labeled with different isotopes was first subjected to a reaction with N-hydroxysuccinimide to obtain an activated ester, and then the activated ester was subjected to a reaction with glycine labeled with different isotopes to obtain the following target compounds Fmoc-$^{15}$N-Ala-Gly (C$_{20}$H$_{20}$N$_2$O$_5$), which had a structure shown as follows:

Fmoc-$^{15}$N-Ala-Gly (C$_{20}$H$_{20}$N$_2$O$_5$): $^1$H NMR (600 MHz, CD$_3$OD): δ=7.79-7.29 (m, 8H), 4.37 (d, J=6.00 Hz, 2H), 4.20 (m, 2H), 3.88 (t, J=18.00 Hz, 2H), 3.31 (dt, J$_1$=J$_2$=6.00 Hz, 2H), 1.36 (dd, J=6.00 Hz, 3H) ppm. $^{13}$C NMR (151 MHz, CD$_3$OD): δ=174.47, 171.66, 156.87 (d, J=33.22 Hz), 143.88 (d, J=27.18 Hz), 141.20, 127.39, 126.77 (d, J=3.02 Hz), 124.84 (d, J=9.06 Hz), 119.52, 66.56, 50.53, 47.00, 40.60, 16.88 ppm.
ESI-MS: [M+Na]$^+$, m/z 392.1212 (theoretical mass: 392.1240, relative error: 7 ppm).

Fmoc-Ala-$^{18}$OH-$^{15}$N-Gly (C$_{20}$H$_{20}$N$_2$O$_5$), which had a structure shown as follows:

Fmoc-Ala-$^{18}$OH-$^{15}$N-Gly (C$_{20}$H$_{20}$N$_2$O$_5$): $^1$H NMR (600 MHz, CD$_3$OD): δ=7.79-7.29 (m, 8H), 4.36 (d, J=6.00 Hz, 2H), 4.19 (dt, J$_1$=12.00 Hz, J$_2$=6.00 Hz, 2H), 3.90 (q, J=18.00 Hz, 2H), 3.31 (dt, J$_1$=J$_2$=6.00 Hz, 2H), 1.36 (d, J=6.00 Hz, 3H) ppm. $^{13}$C NMR (151 MHz, CD$_3$OD): δ=174.56 (d, J=7.55 Hz), 171.54, 156.89, 143.87 (d, J=22.65 Hz), 141.20, 127.39, 126.77 (d, J=3.02 Hz), 124.83 (d, J=6.04 Hz), 119.52, 66.56, 50.53 (d, J=7.55 Hz), 46.98, 40.44 (d, J=13.59 Hz), 16.87 ppm.
ESI-MS: [M+Na]$^+$, m/z 394.1272 (theoretical mass: 394.1283, relative error: 2.8 ppm).

Fmoc-Ala-$^{18}$OH-$^{15}$N,$^{13}$C$_2$-Gly (C$_{20}$H$_{20}$N$_2$O$_5$), which had a structure shown as follows:

Fmoc-Ala-$^{18}$OH-$^{15}$N,$^{13}$C$_2$-Gly (C$_{20}$H$_{20}$N$_2$O$_5$): $^1$H NMR (600 MHz, CD$_3$OD): δ=7.79-7.29 (m, 8H), 4.36 (d, J=6.00 Hz, 2H), 4.20 (m, 2H), 4.02 (dd, J$_1$=J$_2$=6.00 Hz, 1H), 3.78 (dd, J$_1$=J$_2$=6.00 Hz, 1H), 3.31 (dt, J$_1$=J$_2$=6.00 Hz, 1H), 1.37 (d, J=6.00 Hz, 3H) ppm. $^{13}$C NMR (151 MHz, CD$_3$OD): δ=174.57, 171.49 (d, J=58.89 Hz), 156.88, 143.88 (d, J=22.65 Hz), 141.20, 127.39, 126.77 (d, J=3.02 Hz), 124.83 (d, J=9.06 Hz), 119.52, 66.56, 50.52 (d, J=7.55 Hz), 46.98, 40.46 (dt, J=60.40 Hz), 16.87 ppm.
ESI-MS: [M+Na]$^+$, m/z 396.1339 (theoretical mass: 396.1350, relative error: 2.8 ppm).

Fmoc-$^{15}$N-Ala-$^{18}$OH-Gly (C$_{20}$H$_{20}$N$_2$O$_5$), which had a structure shown as follows:

Fmoc-$^{15}$N-Ala-$^{18}$OH-Gly (C$_{20}$H$_{20}$N$_2$O$_5$): $^1$H NMR (600 MHz, CD$_3$OD): δ=7.79-7.29 (m, 8H), 4.37 (d, J=6.00 Hz, 2H), 4.20 (dd, J$_1$=12.00 Hz, J$_2$=6 Hz, 2H), 3.86 (s, 2H), 3.31 (dt, J$_1$=J$_2$=6.00 Hz, 2H), 1.36 (dd, J$_1$=J$_2$=6.00 Hz, 3H) ppm. $^{13}$C NMR (151 MHz, CD$_3$OD): δ=174.30, 172.36, 156.97, 143.88 (d, J=27.18 Hz), 141.20, 127.39, 126.77 (d, J=3.02 Hz), 124.82 (d, J=9.06 Hz), 119.52, 66.58, 50.56, 47.00, 41.07, 16.87 ppm.

ESI-MS: [M+Na]$^+$, m/z 394.1255 (theoretical mass: 394.1283, relative error: 7 ppm).

Fmoc-$^{15}$N-Ala-$^{18}$OH-$^{13}$C$_2$-Gly (C$_{20}$H$_{20}$N$_2$O$_5$), which had a structure shown as follows:

Fmoc-$^{15}$N-Ala-$^{18}$OH-$^{13}$C$_2$-Gly (C$_{20}$H$_{20}$N$_2$O$_5$): $^1$H NMR (600 MHz, CD$_3$OD): δ=7.79-7.29 (m, 8H), 4.37 (d, J=6.00 Hz, 2H), 4.20 (dt, J$_1$=J$_2$=6.00 Hz, 2H), 4.00 (t, J=6.00 Hz, 1H), 3.77 (t, J=6.00 Hz, 1H), 3.31 (dt, J$_1$=J$_2$=6.00 Hz, 2H), 1.36 (dd, J=6.00 Hz, 3H) ppm. $^{13}$C NMR (151 MHz, CD$_3$OD): δ=174.43, 171.66 (d, J=58.89 Hz), 156.77, 143.88 (d, J=27.18 Hz), 141.20, 127.38, 126.77 (d, J=3.02 Hz), 124.82 (d, J=9.06 Hz), 119.52, 66.56, 50.56, 47.00, 40.66 (dd, J=16.61 Hz), 16.88 ppm.

ESI-MS: [M+Na]$^+$, m/z 396.1324 (theoretical mass: 396.1350, relative error: 6 ppm).

Step 4. Preparation of Alanine-Glycine Dipeptide Labeled with Stable Isotopes of Oxygen-18, Carbon-13, and Nitrogen-15

The 9-fluorenylmethoxycarbonyl-alanine-glycine dipeptide (1 mmol) labeled with stable isotopes prepared in the step 3 was taken and dissolved in 15 mL of methanol, two drops of glacial acetic acid were added, and one-tenth of the mass of 10% palladium on carbon was added; after the reaction reagents were added, air was removed by a vacuum pump, then an inert gas was introduced and then replaced with hydrogen, and the reaction was stirred overnight at room temperature. When it was determined by a thin layer chromatography spotting plate that the reaction was completed, the palladium on carbon was removed through filtration with a filter aid of diatomite, and the solvent was removed by a rotary evaporator; and about 10 mL of distilled water was added to a residue to dissolve, extraction was conducted with 10 mL of each of trichloromethane and ethyl acetate, and the aqueous layer were retained, lyophilized, and purified through HPLC to obtain a stable isotope-labeled alanine-glycine dipeptide $^{15}$N-Ala-Gly (C$_5$H$_{10}$N$_2$O$_3$), which had a structure shown as follows:

$^{15}$N-Ala-Gly (C$_5$H$_{10}$N$_2$O$_3$): $^1$H NMR (600 MHz, D$_2$O): δ=4.13 (q, J=6 Hz, 1H), 2.77 (s, 2H), 1.53 (dd, J$_1$=J$_2$=6 Hz, 3H) ppm.

ESI-MS: [M–H]$^-$, m/z 146.0578 (theoretical mass: 146.0584, relative error: 4 ppm).

Similarly, with reference to the same method, the 9-fluorenylmethoxycarbonyl-alanine-glycine dipeptide compounds labeled with other stable isotopes prepared in step 3 were subjected to a de-Fmoc treatment to obtain the following compounds:

Ala-$^{15}$N-Gly (C$_5$H$_{10}$N$_2$O$_3$), which had a structure shown as follows:

Ala-$^{15}$N-Gly (C$_5$H$_{10}$N$_2$O$_3$): $^1$H NMR (600 MHz, D$_2$O): δ=4.19 (q, J=6 Hz, 1H), 2.82 (s, 2H), 1.58 (d, J=6 Hz, 3H) ppm.

ESI-MS: [M–H]$^-$, m/z 146.0578 (theoretical mass: 146.0584, relative error: 4 ppm).

Ala-$^{18}$OH-$^{15}$N-Gly (CF$_{10}$N$_2$O$_3$), which had a structure shown as follows:

Ala-$^{18}$OH-$^{15}$N-Gly (C$_5$H$_{10}$N$_2$O$_3$): $^1$H NMR (600 MHz, D$_2$O): δ=4.03 (q, J=6 Hz, 1H), 2.66 (s, 2H), 1.41 (d, J=6 Hz, 3H) ppm.

ESI-MS: [M–H]$^-$, m/z 148.0613 (theoretical mass: 148.0626, relative error: 8 ppm).

Ala-$^{18}$OH-$^{15}$N,$^{13}$C$_2$-Gly (CF$_{10}$N$_2$O$_3$), which had a structure shown as follows:

Ala-$^{18}$OH-$^{15}$N,$^{13}$C$_2$-Gly (C$_5$H$_{10}$N$_2$O$_3$): $^1$H NMR (600 MHz, D$_2$O): δ=4.15 (q, J=6 Hz, 1H), 2.78 (d, J=6 Hz, 2H), 1.55 (d, J=6 Hz, 3H) ppm.

ESI-MS: [M–H]$^-$, m/z 150.0680 (theoretical mass: 150.0693, relative error: 8 ppm)

$^{15}$N-Ala-$^{18}$OH-Gly (CF$_{10}$N$_2$O$_3$), which had a structure shown as follows:

$^{15}$N-Ala-$^{18}$OH-Gly (C$_5$H$_{10}$N$_2$O$_3$): $^1$H NMR (600 MHz, D$_2$O): δ=4.15 (m, 1H), 2.77 (s, 2H), 1.54 (dd, J$_1$=J$_2$=6 Hz, 3H) ppm.

ESI-MS: [M–H]$^-$, m/z 148.0614 (theoretical mass: 148.0626, relative error: 8 ppm).

$^{15}$N-Ala-$^{18}$OH-$^{13}$C$_2$-Gly (CF$_{10}$N$_2$O$_3$), which had a structure shown as follows:

$^{15}$N-Ala-$^{18}$OH-$^{13}$C$_2$-Gly (C$_5$H$_{10}$N$_2$O$_3$): $^1$H NMR (600 MHz, D$_2$O): δ=4.18 (m, 1H), 2.79 (d, J=6 Hz, 2H), 1.56 (dd, J$_1$=J$_2$=6 Hz, 3H) ppm.

ESI-MS: [M–H]$^-$, m/z 150.0680 (theoretical mass: 150.0693, relative error: 8 ppm).

Step 5. Preparation of diethyl phosphite labeled with deuterium-2 and carbon-13

Absolute ethanol (21.7 mmol, 1 g, 1.26 mL) was taken and dissolved in 5 mL of dichloromethane to obtain an ethanol solution; phosphorus trichloride (7.2 mmol, 995 mg, 632 µL) was dissolved in 2 mL of dichloromethane to obtain a phosphorus trichloride solution, and the phosphorus trichloride solution was cooled to 0° C.; under the protection of nitrogen, the ethanol solution was slowly added dropwise to the phosphorus trichloride solution. The reaction system was transferred to room temperature and the reaction stirred, during which a phosphorus spectrum was tracked every half an hour; 12 h to 14 h later, the reaction was completed, at which point the phosphorus trichloride was exhausted. The organic solvent and hydrochloric acid gas were removed through concentration under reduced pressure by a rotary evaporator. Distillation was conducted under reduced pressure to obtain a colorless or light-yellow oily liquid, which was diethyl phosphite. Similarly, in order to synthesize diethyl phosphite labeled with the stable isotope carbon-13, the raw material ethanol was replaced by ethanol labeled with deuterium-2 and carbon-13 to obtain a series of diethyl phosphites labeled with deuterium-2 and carbon-13, which were as follows:

$^{13}$C$_2$-1-DEPH (C$_2$$^{13}$C$_2$H$_{11}$O$_3$P), which had a structure shown as follows:

$^{13}$C$_2$-1-DEPH (C$_2$$^{13}$C$_2$H$_{11}$O$_3$P): $^1$H NMR (600 MHz, CDCl$_3$): δ=7.30 (s, 0.5H), 6.15 (s, 0.5H), 4.20-4.15 (m, 2H), 3.96-3.90 (m, 2H), 1.29-1.26 (m, 6H) ppm. $^{13}$C NMR (151 MHz, CDCl$_3$): δ=61.95-61.74 (m), 16.26 (dd, J$_1$=7.55 Hz, J$_2$=6.04 Hz) ppm. $^{31}$P NMR (243 MHz, CDCl$_3$): δ=7.48 ppm.

ESI-MS: [M+H]$^+$, m/z 141.0586 (theoretical mass: 141.0591, relative error: 3.5 ppm).

$^{13}$C$_4$-DEPH ($^{13}$C$_4$H$_{11}$O$_3$P), which had a structure shown as follows:

$^{13}$C$_4$-DEPH ($^{13}$C$_4$H$_{11}$O$_3$P): $^1$H NMR (600 MHz, CDCl$_3$): δ=7.35 (s, 0.5H), 6.20 (s, 0.5H), 4.26-4.19 (m, 2H), 4.01-3.95 (m, 2H), 1.45-1.39 (m, 3H), 1.23-1.20 (m, 3H) ppm. $^{13}$C NMR (151 MHz, CDCl$_3$): δ=61.87 (dd, J$_1$=6.04 Hz, J$_2$=4.53 Hz), 16.26 (dd, J$_1$=J$_2$=6.04 Hz) ppm. $^{31}$P NMR (243 MHz, CDCl$_3$): δ=7.50 ppm.

ESI-MS: [M+H]$^+$, m/z 143.0653 (theoretical mass: 143.0658, relative error: 3.5 ppm).

D$_2$$^{13}$C$_2$-DEPH ($^{13}$C$_2$ C$_2$ D$_2$H$_9$O$_3$P), which had a structure shown as follows:

D$_2$$^{13}$C$_2$-DEPH ($^{13}$C$_2$ C$_2$ D$_2$H$_9$O$_3$P): $^1$H NMR (600 MHz, CDCl$_3$): δ=7.32 (s, 0.5H), 6.24 (s, 0.5H), 4.22-4.16 (m, 2H), 4.03-3.96 (m, 2H), 1.44-1.37 (m, 2H), 1.24-1.21 (m, 2H) ppm. $^{13}$C NMR (151 MHz, CDCl$_3$): δ=61.91-61.72 (m), 16.28 (dd, J$_1$=7.51 Hz, J$_2$=6.09 Hz) ppm. $^{31}$P NMR (243 MHz, CDCl$_3$): δ=7.52 ppm ESI-MS: [M+H]$^+$, m/z 143.0639 (theoretical mass: 143.0647, relative error: 5.5 ppm).

Step 6. Preparation of Stable Isotope-Labeled Diethyl Phosphite Alanine-Glycine Dipeptide Activated Esters The reaction conditions were similar to that in Example 1, except that the stable isotope-labeled alanine-glycine dipeptide obtained in the step 4 was used instead of the ordinary alanine-glycine dipeptide and the carbon-13-labeled diethyl phosphite obtained in the step 5 was used instead of the ordinary diethyl phosphite to prepare a stable isotope-labeled diethyl phosphite-alanine-glycine dipeptide, and finally, the stable isotope-labeled diethyl phosphite-alanine-glycine dipeptide was subjected to activation with N-hydroxysuccinimide to prepare the following six-labeled reagents with isobaric stable isotopes.

DEPH-Ala-$^{18}$OH-$^{15}$N,$^{13}$C$_2$-Gly (C$_9$H$_{19}$N$_2$O$_6$P), which had a structure shown as follows:

DEPH-Ala-$^{18}$OH-$^{15}$N,$^{13}$C$_2$-Gly (C$_9$H$_{19}$N$_2$O$_6$P): $^1$H NMR (600 MHz, CDCl$_3$): δ=11.46 (s, 1H), 8.86 (s, 1H), 4.28 (s, 2H), 4.06 (m, 4H), 3.13 (qd, J$_1$=J$_2$=6.00 Hz, 1H), 1.39 (d, J=6.00 Hz, 3H), 1.31 (m, 6H) ppm. $^{13}$C NMR (151 MHz,

CDCl$_3$): δ=172.02 (d, J=28.69 Hz), 169.58, 63.29 (dd, J$_1$=4.53 Hz, J$_2$=6.04 Hz), 45.97, 41.38 (dd, J$_1$=J$_2$=12.08 Hz), 20.84, 16.04 (dd, J$_1$=J$_2$=3.02 Hz) ppm. $^{31}$P NMR (243 MHz, CDCl$_3$): δ=7.31 ppm.

DEPH-$^{15}$N-Ala-$^{18}$OH-$^{13}$C$_2$-Gly, which had a structure shown as follows:

DEPH-$^{15}$N-Ala-$^{18}$OH-$^{13}$C$_2$-Gly (C$_9$H$_{19}$N$_2$O$_6$P): $^1$H NMR (600 MHz, CDCl$_3$): δ=11.93 (s, 1H), 4.05 (q, J=6.00 Hz, 4H), 3.04 (qd, J$_1$=J$_2$=6.00 Hz, 1H), 1.98 (s, 2H), 1.78 (s, 1H), 1.39 (d, J=6.00 Hz, 3H), 1.35 (t, J=6.00 Hz, 6H) ppm. $^{13}$C NMR (151 MHz, CDCl$_3$): δ=172.02 (d, J=28.69 Hz), 171.49, 60.44, 45.85, 41.57 (d, J=58.89 Hz), 21.09, 14.23 ppm. $^{31}$P NMR (243 MHz, CDCl$_3$): δ=7.33 (d, J=43.74 Hz) ppm.

$^{13}$C$_2$-DEPH-Ala-$^{18}$OH-$^{15}$-N-Gly (C$_9$H$_{19}$N$_2$O$_6$P), which had a structure shown as follows:

$^{13}$C$_2$-DEPH-Ala-$^{18}$OH-$^{15}$-N-Gly (C$_9$H$_{19}$N$_2$O$_6$P): $^1$H NMR (600 MHz, CDCl$_3$): δ=10.57 (s, 1H), 6.59 (s, 1H), 4.04 (m, 4H), 3.79 (m, 2H), 3.03 (qd, J$_1$=J$_2$=6.00 Hz, 1H), 1.26 (dt, J$_1$=J$_2$=6.00 Hz, 6H), 1.16 (m, 3H) ppm. $^{13}$C NMR (151 MHz, CDCl$_3$): δ=174.19, 171.64, 62.88 (dd, J$_1$=4.53 Hz, J$_2$=6.04 Hz), 46.11, 41.24 (d, J=12.08 Hz), 20.65, 16.10 (dd, J$_1$=J$_2$=4.53 Hz) ppm. $^{31}$P NMR (243 MHz, CDCl$_3$): δ=7.34 ppm.

$^{13}$C$_2$-DEPH-$^{15}$N-Ala-$^{18}$OH-Gly (C$_9$H$_{19}$N$_2$O$_6$P), which had a structure shown as follows:

$^{13}$C$_2$-DEPH-$^{15}$N-Ala-$^{18}$OH-Gly (C$_9$H$_{19}$N$_2$O$_6$P): $^1$H NMR (600 MHz, CDCl$_3$): δ=11.61 (s, 1H), 8.34 (s, 1H), 4.23 (d, J=6.00 Hz, 4H), 3.99 (m, 2H), 3.15 (qd, J=6.00 Hz, 1H), 1.42 (t, J=6.00 Hz, 6H), 1.34 (m, 3H) ppm. $^{13}$C NMR (151 MHz, CDCl$_3$): δ=173.85 (d, J=6.04 Hz), 172.14, 63.26 (dd, J$_1$=4.53 Hz, J$_2$=6.04 Hz), 45.93, 41.53, 20.88 (d, J=4.53 Hz), 16.03 (dd, J$_1$=J$_2$=7.55 Hz) ppm. $^{31}$P NMR (243 MHz, CDCl$_3$): δ=7.28 (dt, J$_1$=J$_2$=31.59 Hz) ppm.

$^{13}$C$_4$-DEPH-Ala-$^{15}$N-Gly (C$_9$H$_{19}$N$_2$O$_6$P), which had a structure shown as follows:

$^{13}$C$_4$-DEPH-Ala-$^{15}$N-Gly (C$_9$H$_{19}$N$_2$O$_6$P): $^1$H NMR (600 MHz, CDCl$_3$): δ=11.25 (s, 1H), 8.79 (s, 1H), 4.16 (m, 4H), 3.91 (m, 2H), 3.11 (qd, J$_1$=J$_2$=6.00 Hz, 1H), 1.36 (t, J=6.00 Hz, 6H), 1.17 (m, 3H) ppm. $^{13}$C NMR (151 MHz, CDCl$_3$): δ=174.01 (dd, J=J$_2$=6.04 Hz), 171.79, 63.49 (dd, J=J$_2$=6.04 Hz), 46.01, 41.43 (d, J=12.08 Hz), 20.80 (d, J=6.04 Hz), 15.98 (m) ppm. $^{31}$P NMR (243 MHz, CDCl$_3$): δ=7.29 ppm.

$^{13}$C$_4$-DEPH-$^{15}$N-Ala-Gly (C$_9$H$_{19}$N$_2$O$_6$P), which had a structure shown as follows:

$^{13}$C$_4$-DEPH-$^{15}$N-Ala-Gly (C$_9$H$_{19}$N$_2$O$_6$P): $^1$H NMR (600 MHz, CDCl$_3$): δ=10.55 (s, 1H), 9.55 (s, 1H), 3.95 (m, 4H), 3.75 (m, 2H), 2.95 (m, 1H), 1.17 (t, J=6.00 Hz, 6H), 0.97 (m, 3H) ppm. $^{13}$C NMR (151 MHz, CDCl$_3$): δ=174.18 (d, J=6.04 Hz), 171.34, 62.78 (dd, J=7.55 Hz), 46.05, 41.19, 20.64 (d, J=4.53 Hz), 15.91 (m) ppm. $^{31}$P NMR (243 MHz, CDCl$_3$): δ=7.15 ppm.

D$_2$$^{13}$C$_2$-DEPH-$^{15}$N-Ala-Gly (C$_9$H$_{19}$N$_2$O$_6$P), which had a structure shown as follows:

D$_2$$^{13}$C$_2$-DEPH-$^{15}$N-Ala-Gly (C$_9$H$_{19}$N$_2$O$_6$P): $^1$H NMR (600 MHz, CDCl$_3$). δ=10.52 (s, 1H), 9.54 (s, 1H), 3.91 (m, 4H), 3.79 (m, 2H), 2.93 (m, 1H), 1.20 (t, J=6.00 Hz, 4H), 0.98 (m, 3H) ppm. $^{13}$C NMR (151 MHz, CDCl$_3$): δ=174.13 (d, J=6.02 Hz), 171.39, 62.75 (dd, J=7.53 Hz), 46.02, 41.21, 20.622 (d, J=4.51 Hz), 15.88 (m) ppm. $^{31}$P NMR (243 MHz, CDCl$_3$): δ=7.12 ppm.

Example 4 Total Proteolytic Peptides Extracted from Hela Cells and Derivatization Analysis with an iSIPL$^0$ Reagent Taking the extraction of total proteolytic peptides from Hela cells as an example, the medium used for the culture was DMEM medium, and the cell culture conditions were 37° C. and 5% CO$_2$.

The cellular protein was extracted through the following steps:

(1) Cell collection: Cells were collected with a cell scraper and washed twice with IX PBS.

(2) Cells were subjected to lysis (Lysis Buffer: 1% SDS, 350 mM NaCl, 50 mM Hepes.KOH, pH 7.8, 5 mM EDTA, 1 mM DTT, 0.5 mM PMSF).

(3) An ultrasonic treatment at a power of 80% was conducted 8 times at an interval of 30 s for 10 s each time.

(4) A lysate and cell debris were collected and centrifuged for 15 min at 4° C. and 13,000 g.

(5) A supernatant was transferred to a new 15 mL centrifuge tube, and a protein concentration was determined with a BCA kit (Product No. 23227). A total protein concentration was 2.3875 µg/µL.

(6) 1 mg of a total protein extract was taken to conduct a reductive alkylation experiment: 419 µL of the total protein extract was taken and mixed with 3 mL of a UA solution (which was prepared by dissolving 8 M Urea into 0.1 M Tris-HCl pH=8.0) in Filter units, centrifuged at 3,000 g for about 1 h, and the centrifugation was repeated 3 times; 50 mM DTT (dissolved in the UA solution above) was added to the Filter units to allow a reaction at room temperature for 30 min, centrifuged at 3,000 g for about 1 h; 50 mM IAA (dissolved in the UA solution above) was added to the Filter units to allow a reaction at room temperature in the dark for 30 min, centrifuged at 3,000 g for about 1 h; 3 mL of the UA solution was added to the Filter units, centrifuged at 3,000 g for about 1 h, and the operation was repeated 6 times; and 3 mL of 100 mM TEAB was added to the Filter units, centrifuged at 3,000 g for about 1 h, and the operation was repeated 3 times.

(7) Trypsin digestion: 20 µg of trypsin (dissolved in 1 mL of 100 mM TEAB) was added and incubated in a 37° C. water bath for 16 h.

(8) Desalination: A trypsin-digested sample was acidified to a pH of 2 to 4; column washing: 0.1 mL to 1 mL of acetonitrile was added to a column for washing and pressurized to a liquid level close to a filler; balancing: 0.1 mL to 1 mL of a 0.1% formic acid aqueous solution was added for equilibration and pressurized to a liquid level close to the filler, and the equilibration operation was repeated twice; Loading: the sample was totally transferred to the column; desalination: 0.1 mL to 1 mL of a 0.1% formic acid aqueous solution was added to wash the column, and the column washing was repeated twice; eluting: 100 µL of an eluent (70% acetonitrile/30% water/0.1% formic acid) was added, and a sample obtained after eluent was transferred to a low protein adsorption tube, dried, and stored at −20° C.

Derivatization reaction steps: A concentration of peptides obtained after enzymolysis was determined by a protein concentration detector, and a peptide solution was evenly dispensed into several tubes (25 µg to 100 µg per tube). Two of the tubes were taken to conduct an experiment, with one tube as a blank control and the other tube for a derivatization reaction with an iSIPL⁰ reagent. iSIPL⁰ was dissolved in 50 µL of acetonitrile, added to 100 µL of a peptide solution, thoroughly shaken, subjected to a reaction in an ice bath for half an hour, and then transferred to room temperature and subjected to a reaction for half an hour; and the acetonitrile was removed through dry centrifugation, and subjected to acid adjustment, desalination, and MS analysis.

A structure of the iSIPL⁰ labeling reagent was as follows:

LC-MS/MS analysis.

LC-MS/MS analysis conditions were as follows: nano-UHPLC Proxeon Easy-nLC 1000 coupled LTQ-Orbitrap Q-Exactive MS of Thermo Scientific was adopted; after being injected into a liquid chromatograph, a sample was first captured by a capture column (C18, 3 µm, 2 cm×100 µm), then entered an analytical column (Acclaim PepMap RSLC-C18, 2.0 µm, 150 mm×75 µm), and was separated, with a total injection amount of 1 µg of polypeptides. Chromatographic conditions: a gradient elution was conducted for 120 min with 5% to 45% of acetonitrile with 0.1% formic acid; flow rate: 250 nL/min. An effluent from the column directly entered an electrospray ionization source of the MS. HCD fragments were used for a Q-exactive platform. The top 20 ions in abundance were selected to allow crushing and dynamic exclusion for 20 s. The original data files were generated by Xcalibur software (Thermo Scientific) and processed by Proteome Discoverer V2.1; and the human protein database of Swiss-Prot was searched by the search software SEQUEST to complete the peptide identification and quantitative analysis. The results of protein identification were shown in Table 1:

TABLE 1

Detected protein number for blank control and iSIPL⁰-labeled total proteolytic peptides extracted from Hela cells.

|  | Proteins |
| --- | --- |
| Control | 2,552 |
| iSIPL⁰ | 2,002 |

It can be seen from Table 1 that, when the total proteolytic peptides extracted from Hela cells were only used as a blank control without undergoing a derivatization reaction, 2,552 proteins were searched; and when the total proteolytic peptides were subjected to a derivatization reaction with a iSIPL⁰ labeling reagent, 2,002 proteins were searched, indicating that the labeling reagent exhibited high labeling efficiency with low protein loss.

Example 5 Comparative Analysis of a Labeling Reagent iSIPL⁰ and a Commercial Labeling Reagent TMT⁰

The experimental methods of total protein extraction and enzymolysis to produce peptides were the same as that in Example 4.

Figure 2A:
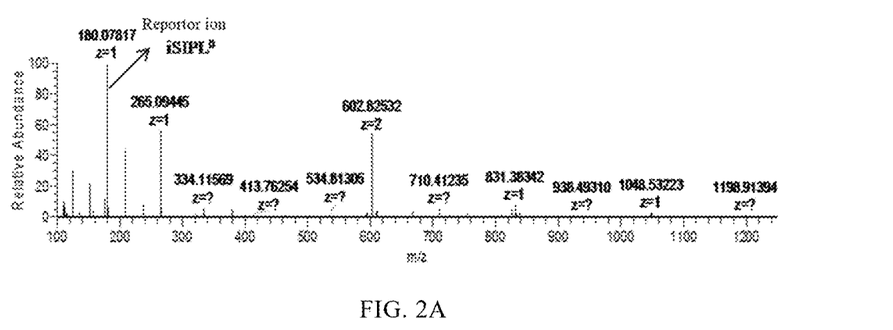
FIGS. 2A-2B show secondary MS fragment spectra of iSIPL⁰ and TMT⁰ labeling reagents.
Figure 2B:
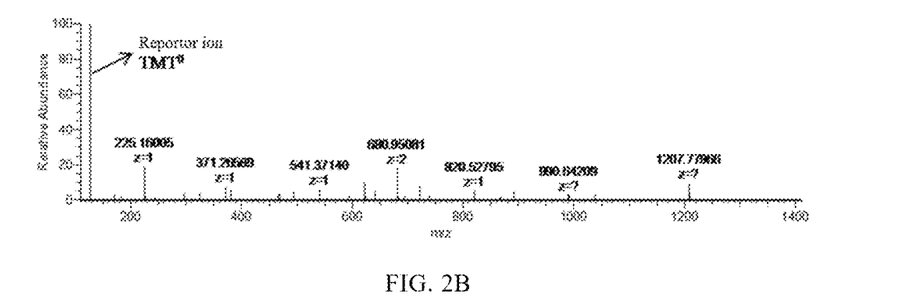

A concentration of the peptides obtained after enzymolysis was determined, and a peptide solution was evenly dispensed into four tubes for test. 120 µL of a solution of iSIPL⁰ (3 mg) in acetonitrile was added to each of two of the tubes with a ratio of m(iSIPL⁰) to m(peptide) being 30:1, such that two parallel test tubes were set; and L of a solution of TMT⁰ (0.8 mg) in acetonitrile was added to each of the other two tubes with a ratio of m(TMT0) to m(peptide) being 8:1, such that two parallel test tubes were set. After the derivatization reaction was completed, the acid adjustment, desalination, and MS analysis were conducted. A fragment ion peak of mass spectrometry analysis was shown in FIGS. 2A-2B; and protein identification results were shown in Table 2 and FIG. 3.

TABLE 2

Detection results of iSIPL⁰ and TMT⁰ labeled peptides

| | Proteins | Peptides | PSMs | MS/MS |
|---|---|---|---|---|
| Control | 2322 | 10782 | 14023 | 44792 |
| TMT | 1544 | 6984 | 9410 | 47974 |
| iSIPL | 1758 | 5396 | 6224 | 38955 |
| Control-repeat | 2337 | 10801 | 13537 | 44287 |
| TMT-repeat | 1383 | 5831 | 8055 | 46608 |
| iSIPL-repeat | 1742 | 5171 | 5914 | 38240 |

Figure 3:
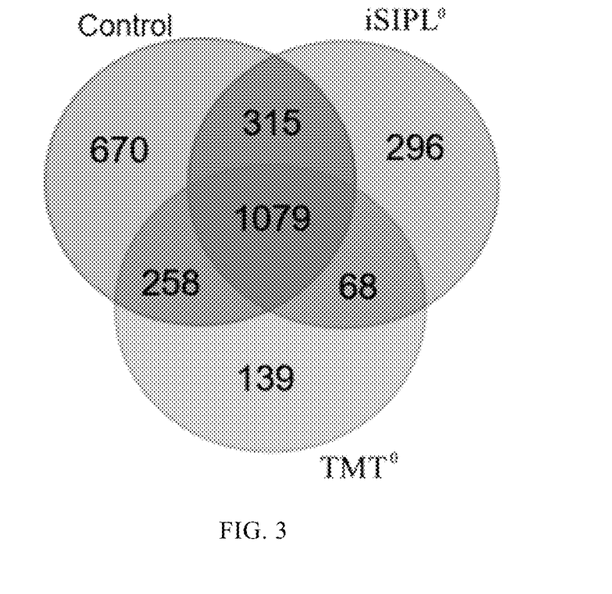
FIG. 3 shows a comparison of identification species of 1 μg Hela peptides labeled with iSIPL⁰ and TMT⁰.

It can be seen from Table 2 and FIG. 3 that, for 1 µg of labeled Hela peptides, 1,758 proteins were detected with iSIPL⁰ and 1,544 proteins were detected with TMT⁰, indicating that the iSIPL labeling reagent exhibited a prominent identification effect and high detection repeatability for trace proteins.

Example 6 BSA Standard Peptide Concentration Gradient Experiment: Different Concentrations of Standard Peptides were Subjected to Derivatization with iSIPL⁰

This Example was the same as Example 4 except that, a BSA standard protein was used instead of the total protein extracted from Hela cells for reductive alkylation and enzymolysis to produce peptides; the peptides obtained after enzymolysis of the BSA standard protein were tested for concentration and diluted to different concentrations of 0.002λ, 0.01λ, 0.05λ, 0.25λ, 0.8λ, and the like to conduct a standard peptide concentration gradient experiment. The different concentrations of BSA standard peptides were each subjected to derivatization with the iSIPLzero reagent at a same mass to determine the lowest concentration of peptides that could be identified by the chemical labeling reagent.

The detection results were shown in Table 3.

TABLE 3

Results of the BSA standard peptide concentration gradient experiment

| $c(BSA)/\mu g \cdot \mu L^{-1}$ | 0.002 | 0.01 | 0.05 | 0.25 | 0.8 |
|---|---|---|---|---|---|
| Peptides | 70 | 85 | 87 | 104 | 103 |
| PSMs | 517 | 965 | 1540 | 2163 | 2506 |
| Coverage/% | 88 | 92 | 90 | 94 | 93 |

Standard proteolysis: 250 µg of a BSA protein was dissolved in a 0.1 M Tris/HCl pH 8.0 (8 M urea) buffer, added to a 10 KD concentration tube and centrifuged at 14,000 g until about 30 µL was left; 100 µL of a DTT solution was added, thoroughly mixed, allowed to stand at room temperature for 30 min, and centrifuged at 14,000 g for 30 min; 100 µL of an IAA solution was added, thoroughly mixed, allowed to stand at room temperature for 5 min, centrifuged at 14,000 g for 30 min; 100 µL of a 0.1 M Tris/HCl pH 8.0 (8 M urea) solution was added to the concentration tube and the concentration tube was centrifuged at 14,000 g for 40 min, and the operation was repeated twice; 160 µL of a triethylammonium bicarbonate solution with trypsin (a ratio of the trypsin to the protein was 1:50) was added to the concentration tube, thoroughly mixed and incubated at 37° C. for 16 h; a collection tube was changed, and the concentration tube was centrifuged at 14,000 g for 40 min; 50 µL of 0.5 M NaCl was added, and the concentration tube was centrifuged at 14,000 g for 20 min; and a resulting product was acidified with formic acid (with a pH of 2 to 4) and subjected to desalination according to the desalination method in Example 4 and then to MS analysis.

Example 7 Concentration Gradient Experiment of Total Proteolytic Peptides Extracted from Hela Cells: Different Concentrations of Peptides were Each Subjected to Derivatization with iSIPL⁰

Like Example 4, the total protein was extracted from Hela cells and subjected to reductive alkylation, enzymolysis, and then derivatization to obtain a proteolysis solution with a total protein concentration of 0.6 µg/µL, and the proteolysis solution was diluted to the different concentrations of 0.002 µg/µL, 0.01 µg/µL, 0.05 µg/µL, 0.25 µg/µL, 0.6 µg/µL, and the like to conduct an enzymatic peptide concentration gradient experiment. The different concentrations of peptides extracted from HELA cells (100 µL) were subjected to derivatization with the iSIPLzero reagent at a same mass (2 mg), and after the reaction was completed, a resulting product was desalted according to Example 4, detected by MS, and searched in a protein library.

The test results were shown in Table 4.

TABLE 4

Results of Hela total proteolytic peptide concentration gradient experiment

| $c(BSA)/\mu g \cdot \mu L^{-1}$ | 0.002 | 0.01 | 0.05 | 0.25 | 0.6 |
|---|---|---|---|---|---|
| Proteins | 579 | 1059 | 1951 | 2560 | 2721 |
| Peptides | 1545 | 3508 | 8461 | 11858 | 13041 |
| PSMs | 2622 | 6017 | 14691 | 20858 | 22913 |

Example 8 Quantification of Hela Total Proteolytic Peptides by an iSIPL Two-Labeling Reagent Two samples (10 µg of the Hela total proteolytic peptides) were taken; iSIPL²-180 was added to one of the two samples and an equal amount of iSIPL²-181 was added to the other one, a derivatization reaction was conducted at a low temperature for half an hour and then at room temperature for 1 h. After the reaction was completed, the acetonitrile was removed by centrifugal drying, a pH of a residue was adjusted to 2 to 3 with 1% to 2.5% formic acid, and a resulting product was then desalted according to Example 4 and tested by MS. MS data was analyzed by the MaxQuant software. The results showed that a total of 1,582 proteins were detected, among which 1,580 proteins had a report ion strength ratio of 0.5 to 2, indicating that the iSIPL²-plex labeling reagent could well quantify a complex protein sample.

Structures of the two iSIPL labeling reagents were as follows:

iSIPL²-180 iSIPL²-181

Example 9 Quantification of the BSA Standard Protein with an iSIPL⁶ Standard Reagent A specified amount of the BSA standard protein was weighed, subjected to reductive alkylation and enzymolysis, tested for concentration, and divided into six portions according to a mass ratio of 3:3:3:1:1:1. The six labeling reagents of iSIPL⁶-180, iSIPL⁶-181, iSIPL⁶-182, iSIPL⁶-183, iSIPL⁶-184, and iSIPL⁶-185 were added at an equal amount to the six portions, respectively, and a derivatization reaction was conducted at a low temperature for half an hour and then at room temperature for 1 h.

After the reaction was completed, the acetonitrile was removed by centrifugal drying, a pH of a residue was adjusted to 2 to 3 with 1% to 2.5% formic acid, and a resulting product was then desalted according to Example 4, tested by MS, and searched in a protein library. Some peptides were selected for sequence analysis, as shown in Table 5.

TABLE 5

Some search results of standard peptides quantified with the six labeling reagents of iSIPL

| Sequence | Ratio | | | | |
|---|---|---|---|---|---|
| | 181/180 | 182/180 | 183/180 | 184/180 | 185/180 |
| ESHAGcEk | 1.254 | 1.176 | 0.333 | 0.240 | 0.396 |
| DTHkSEIAHR | 1.191 | 0.964 | 0.339 | 0.228 | 0.345 |
| TcVADESHAGcEk | 1.070 | 0.957 | 0.319 | 0.187 | 0.377 |
| ccTESLVNR | 1.320 | 1.177 | 0.398 | 0.308 | 0.283 |

It can be seen from Table 5 that there is an obvious characteristic reporter ion peak m/z 180-185 in the reporter ion generation region, indicating that the phosphate group has high sensitivity in MS detection, and is successfully labeled with the six labeling reagents. The quantification result is accurate.

Structures of the iSIPL⁶ labeling reagents were as follows:

Example 10 Quantification of a Urine Protein with an iSIPL⁶ Labeling Reagent A protein was extracted from a urine sample by a method with reference to a literature. 200 μL of urine was taken and centrifuged, the supernatant was added to a filter (3 K) and centrifuged at 13,000 rpm, and the protein in the centrifuge tube was subjected to reductive alkylation with reference to Example 4, tested for concentration, and divided into six portions; the six labeling reagents of iSIPL⁶-180, iSIPL⁶-181, iSIPL⁶-182, iSIPL⁶-183, iSIPL⁶-184, and iSIPL⁶-185 were added at an equal amount to the six portions, respectively; a derivatization reaction was conducted at a low temperature for half an hour and then at room temperature for 1 h; and after the reaction was completed, the acetonitrile was removed by centrifugal drying, a pH of a residue was adjusted to 2 to 3 with 1% to 2.5% formic acid, and a resulting product was then desalted according to Example 4 and tested by MS. MS data was analyzed by the MaxQuant software. The results showed that a total of 1,459 proteins were detected, among which 1,406 proteins had a report ion strength ratio of 0.5 to 2, indicating that the iSIPL⁶ labeling reagent could well quantify a protein in a urine sample.

Example 11 Quantification of a Blood Protein with an iSIPL⁶ Labeling Reagent

A serum protein was extracted by a method with reference to a literature. 200 μL of a serum sample was taken and centrifuged, the supernatant was added to a filter (3 K) and centrifuged at 13,000 rpm, and the protein in the centrifuge tube was subjected to reductive alkylation with reference to Example 4, tested for concentration, and divided into six portions; the six labeling reagents of iSIPL⁶-180, iSIPL⁶-181, iSIPL⁶-182, iSIPL⁶-183, iSIPL⁶-184, and iSIPL⁶-185 were added at an equal amount to the six portions, respectively; a derivatization reaction was conducted at a low temperature for half an hour and then at room temperature for 1 h; and after the reaction was completed, the acetonitrile was removed by centrifugal drying, a pH of a residue was adjusted to 2 to 3 with 1% to 2.5% formic acid, and a resulting product was then desalted according to Example 4 and tested by MS. MS data was analyzed by the MaxQuant software. The results showed that a total of 2,732 proteins were detected, among which 2,686 proteins had a report ion strength ratio of 0.5 to 2, indicating that the iSIPL⁶ labeling reagent could well quantify a protein in serum.

What is claimed is:

1. An isobaric stable isotope-containing phosphorylated protein labeling reagent comprising a structural formula as follows:

wherein a is 14 or 15; b is 12 or 13; c is 16 or 18; d is 1 or 2; n is 1, 2, 3, 4, or 5; $n_1$ is 0, 1, or 2; $R_1$ is a side chain substituent of an L or D-configuration amino acid with or without a stable isotope; and $R_2$ is a side chain substituent of an amino acid with or without a stable isotope.

2. A preparation method of the isobaric stable isotope-containing phosphorylated protein labeling reagent according to claim 1, comprising the following steps:

(1) a preparation of an isobaric stable isotope-containing amino acid with an N-terminal protection by the following two methods:
method A: dissolving an isobaric stable isotope-containing amino acid $R_1$ in an alkali solution, cooling, and adding an organic solvent for a dissolution to obtain an amino acid mixed solution; dissolving 9-fluorenylmethyl chloroformate in the organic solvent to obtain a first resulting solution and slowly adding the first resulting solution to the amino acid mixed solution to obtain a first resulting mixture; stirring the resulting mixture at a low temperature to allow a first reaction and further stirring the first resulting mixture at room temperature to allow a second reaction; and removing the organic solvent to obtain a first residue, and purifying the first residue to obtain an isobaric stable isotope-containing amino acid Fmoc-$R_1$ protected by 9-fluorenylmethoxycarbonyl;
method B: dissolving an isobaric stable isotope-containing amino acid $R_1$ in an alkali solution, cooling, and adding an organic solvent for a dissolution to obtain an amino acid mixed solution; dissolving di-tert-butyl dicarbonate in 1,4-dioxane to obtain a second resulting solution and slowly adding the second resulting solution to the amino acid mixed solution to obtain a second resulting mixture; stirring the second resulting mixture at a low temperature to allow a third reaction and further stirring the second resulting mixture at room temperature to allow a fourth reaction; and removing the organic solvent to obtain a second residue, and purifying the second residue to obtain an isobaric stable isotope-containing amino acid Boc-$R_1$ protected by tert-butoxycarbonyl;
(2) a preparation of an isobaric stable isotope-containing amino acid activated ester Fmoc/Boc-$R_1$-NHS with an N-terminal protection:
dissolving the Fmoc/Boc-$R_1$ prepared in the step (1) and N-hydroxysuccinimide in an organic solvent, and adding a condensation agent to allow a condensation reaction to obtain the isobaric stable isotope-containing amino acid activated ester Fmoc/Boc-$R_1$-NHS with the N-terminal protection;
(3) a preparation of an isobaric stable isotope-containing dipeptide:
dissolving the Fmoc/Boc-$R_1$-NHS prepared in the step (2) in a mixed solvent to obtain a third resulting solution and adding the third resulting solution to an alkali solution of an isobaric stable isotope-containing amino acid $R_2$ at a low temperature to obtain a third resulting mixture; stirring the third resulting mixture at a low temperature to allow a fifth reaction and further stirring the third resulting mixture at room temperature to allow a sixth reaction; and removing the organic solvent to obtain a third residue, purifying the third residue, and subjecting the third residue to a de-Fmoc/Boc treatment to obtain the isobaric stable isotope-containing dipeptide;
(4) a preparation of an isobaric stable isotope-containing phosphite: under a protection of an inert atmosphere, preparing a mixed solution with an isobaric stable isotope-containing alcohol solvent and dichloromethane (DCM), and slowly adding the mixed solution dropwise to a DCM solution of phosphorus trichloride in an ice bath to obtain a fourth resulting mixture; stirring the fourth resulting mixture at room temperature to allow a seventh reaction, tracking the seventh reaction until the phosphorus trichloride is exhausted, and stopping the seventh reaction; and removing the isobaric stable isotope-containing alcohol solvent and hydrochloric acid, and subjecting a resulting oily product to a vacuum distillation;

(5) a preparation of an isobaric stable isotope-containing phosphite dipeptide:

dissolving the isobaric stable isotope-containing dipeptide prepared in the step (3) in a mixed solution of water and ethanol, adding triethylamine (TEA), stirring at a low temperature, and slowly adding a mixed solution of the isobaric stable isotope-containing phosphite prepared in the step (4) and 6 to 10 equivalents of carbon tetrachloride dropwise to obtain a fifth resulting mixture; stirring the fifth resulting mixture at a low temperature to allow an eighth reaction and further stirring the fifth resulting mixture at room temperature to allow a ninth reaction; and removing the solvent to obtain a fourth residue, and purifying the fourth residue to obtain a stable isotope-labeled phosphite-alanine-glycine dipeptide; and (6) a preparation of a stable isotope-labeled N-phosphorylated amino acid activated ester:

dissolving the stable isotope-labeled phosphite-alanine-glycine dipeptide prepared in the step (5) and N-hydroxysuccinimide in an organic solvent, and adding a condensation agent to allow a condensation reaction; and removing the organic solvent to obtain a fifth residue, and purifying the fifth residue to obtain the isobaric stable isotope-containing phosphorylated protein labeling reagent.

3. The preparation method of the isobaric stable isotope-containing phosphorylated protein labeling reagent according to claim 2, wherein in the steps (1) and (3), the alkali solution is one selected from the group consisting of a sodium hydroxide solution, a potassium hydroxide solution, a sodium carbonate solution, and a sodium bicarbonate solution; the cooling and the low temperature are each achieved by an ice bath; and each of the first reaction, the third reaction, and the fifth reaction under stirring at the low temperature is conducted for 2 h to 4 h and each of the second reaction, the fourth reaction, and the sixth reaction under stirring at the room temperature is conducted for 5 h to 12 h.

4. The preparation method of the isobaric stable isotope-containing phosphorylated protein labeling reagent according to claim 2, wherein in the steps (2) and (6), the organic solvent is one selected from the group consisting of ethylene glycol dimethyl ether and carbon dichloride; and the condensation agent is one selected from the group consisting of dicyclohexylcarbodiimide (DCC) and 1-(3-dimethylaminopropyl)-3-ethylcarbodiimide hydrochloride (EDCI).

5. The preparation method of the isobaric stable isotope-containing phosphorylated protein labeling reagent according to claim 2, wherein in the step (5), the low temperature is achieved by an ice bath; and the eighth reaction under stirring at the low temperature is conducted for 2 h to 4 h and the ninth reaction under stirring at the room temperature is conducted for 4 h to 6 h.

6. The preparation method of the isobaric stable isotope-containing phosphorylated protein labeling reagent according to claim 2, wherein in the step (4), the isobaric stable isotope-containing alcohol solvent is one selected from the group consisting of methanol, ethanol, propanol, butanol, and amyl alcohol.

7. A method of an application of the isobaric stable isotope-containing phosphorylated protein labeling reagent according to claim 1 in a quantitative analysis of a polypeptide.

8. A method of an application of the isobaric stable isotope-containing phosphorylated protein labeling reagent according to claim 1 in a quantitative analysis of a standard protein or a protein in a cell.

9. A method of an application of the isobaric stable isotope-containing phosphorylated protein labeling reagent according to claim 1 in a quantitative analysis of a protein in a urine sample.

10. A method of an application of the isobaric stable isotope-containing phosphorylated protein labeling reagent according to claim 1 in a quantitative analysis of a protein in a blood sample.

11. The isobaric stable isotope-containing phosphorylated protein labeling reagent according to claim 1, wherein n is 1 or 2; and $n_1$ is 0 or 1.

12. The isobaric stable isotope-containing phosphorylated protein labeling reagent according to claim 1, wherein $R_1$ is methyl; and $R_2$ is hydrogen.

13. The preparation method of the isobaric stable isotope-containing phosphorylated protein labeling reagent according to claim 3, wherein in the steps (1) and (3), the alkali solution is the sodium carbonate solution.

14. The preparation method of the isobaric stable isotope-containing phosphorylated protein labeling reagent according to claim 2, wherein in the step (4), the isobaric stable isotope-containing alcohol solvent is methanol or ethanol.

* * * * *